United States Patent
Hiramatsu

(10) Patent No.: US 7,500,457 B2
(45) Date of Patent: Mar. 10, 2009

(54) ENERGIZATION CONTROL APPARATUS AND METHOD FOR GLOW PLUG DURING THE PERIOD FROM PREGLOW TO AFTERGLOW STEPS

(75) Inventor: Hiromi Hiramatsu, Kariya (JP)

(73) Assignee: DENSO Corporation, Kariya (JP)

( * ) Notice: Subject to any disclaimer, the term of this patent is extended or adjusted under 35 U.S.C. 154(b) by 0 days.

(21) Appl. No.: 11/785,049

(22) Filed: Apr. 13, 2007

(65) Prior Publication Data
US 2007/0240663 A1 Oct. 18, 2007

(30) Foreign Application Priority Data
Apr. 13, 2006 (JP) .............................. 2006-110813

(51) Int. Cl.
*F02N 17/00* (2006.01)

(52) U.S. Cl. ................................. 123/145 A; 123/179.6

(58) Field of Classification Search .............. 123/179.6, 123/145 R, 145 A
See application file for complete search history.

(56) References Cited

U.S. PATENT DOCUMENTS

| | | | | |
|---|---|---|---|---|
| 4,375,205 | A | * | 3/1983 | Green .................... 123/179.21 |
| 6,164,258 | A | * | 12/2000 | Petrovich et al. .......... 123/179.6 |
| 6,637,392 | B2 | | 10/2003 | Jung |
| 6,722,334 | B2 | | 4/2004 | Streng |
| 6,843,218 | B2 | * | 1/2005 | Kumada et al. .......... 123/179.6 |

FOREIGN PATENT DOCUMENTS

| | | |
|---|---|---|
| DE | 101 38 997 A1 | 3/2003 |
| EP | 1 447 560 A1 | 8/2004 |
| GB | 2 303 470 | 2/1997 |
| JP | 63-255569 | 10/1988 |
| JP | 63-259166 | 10/1988 |
| JP | 05-321811 | 12/1993 |
| JP | 09-032606 | 2/1997 |
| JP | 2001-227438 | 8/2001 |
| JP | 2003-065195 | 3/2003 |
| JP | 2003-328777 | 11/2003 |
| JP | 2007-285153 | * 11/2007 |
| KR | 2002-0022359 | 3/2002 |

\* cited by examiner

*Primary Examiner*—Hai H Huynh
(74) *Attorney, Agent, or Firm*—Nixon & Vanderhye P.C.

(57) ABSTRACT

A control apparatus for controlling to supply of electric power to both a glow plug and a starter from a power source, the starter assisting start of the engine by using the glow plug, is provided. The control apparatus comprises a starter switch, starter, a detecting device detecting a state of the engine, a calculating circuit calculating a pre-glow time, an after-glow time, and a delay time. These times depend on both the detected state of the engine detected by the detecting device and a timing when the starter switch is turned on to a power-on position thereof. The control circuit controls the supply of the electric power to both the glow plug and the starter based on the delay time, the pre-glow time, and the after-glow time.

15 Claims, 16 Drawing Sheets

FIG.12
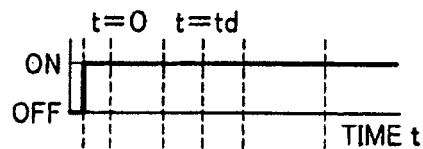
(A) KEY SWITCH
(B) STARTER SWITCH
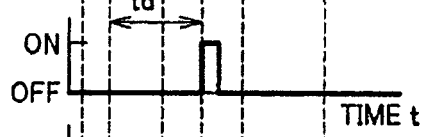
(C) COUNTER OUTPUT
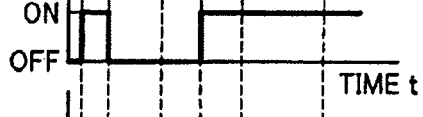
(D) GLOW PLUG VOLTAGE
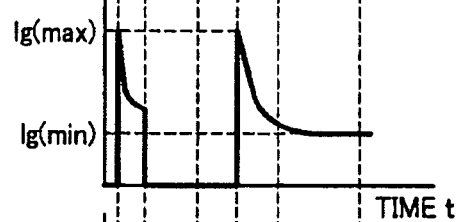
(E) GLOW PLUG CURRENT Ig
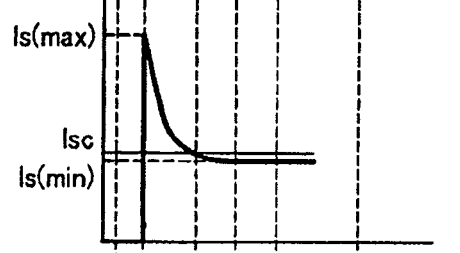
(F) STARTER CURRENT Is
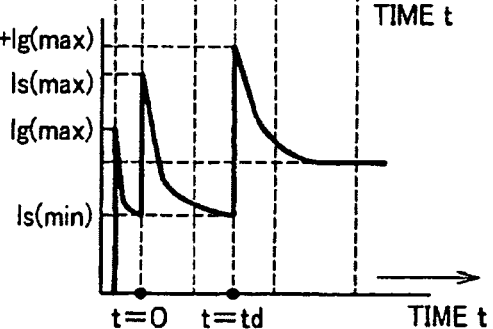
(G) TOTAL CURRENT I
| | |
|---|---|
| td: DELAY TIME | Ig(max): MAXIMUM GLOW PLUG CURRENT |
| Is(max): MAXIMUM STARTER CURRENT | Ig(min): MINIMUM GLOW PLUG CURRENT |
| Is(min): MINIMUM STARTER CURRENT | Isc: RATED STARTER CURRENT |

ENERGIZATION CONTROL APPARATUS AND METHOD FOR GLOW PLUG DURING THE PERIOD FROM PREGLOW TO AFTERGLOW STEPS

CROSS REFERENCE TO RELATED APPLICATION

The present application relates to and incorporates by reference Japanese Patent Application No. 2006-110813 filed on Apr. 13, 2006.

BACKGROUND OF THE INVENTION

1. The Field of the Invention

The present invention relates to an apparatus and a method for controlling a glow plug, and more particularly to an apparatus and a method for controlling electronic power supplied to the glow plug so as to assure activation and running in a steady state of a diesel engine of an automotive vehicle whenever an operator of the automotive vehicle turns key switch on.

2. Description of the Prior Art

A Diesel engine is substantially different from a sparked ignition internal combustion engine in that the diesel engine does not have a sparking device such as a spark plug which is provided in the sparked ignition internal combustion engine. In the diesel engine, fuel is ignited and a piston of the engine cylinder is driven when fuel and hot compressed air are mixed in the engine cylinder. For this ignition to occur effectively, the engine must be brought to a temperature at or above a minimum ignition temperature for a mixture of fuel and hot compressed air. One method to enhance reliability of starting the diesel engine especially in a cold season is to install a glow plug in each cylinder and to operate the glow plug to heat the mixture of fuel and hot compressed air in the cylinder head, thereby assuring starting of the diesel engine.

A glow plug generally uses a resistance heater. This glow plug is attached to an engine block of the diesel engine such that a tip of the resistance heater is positioned in the combustion chamber or cylinder. The mixture of fuel and hot compressed air (which may be abbreviated as the "fuel-air mixture" in the following) has an operating temperature at or above which the diesel engine can achieve ignition and run efficiently. When the fuel-air mixture is injected to the combustion chamber after the temperature of the resistance heater of the glow plug is raised up to an operating temperature, the temperature of the fuel-air mixture can reach the operating temperature thereof. In this situation where the temperature of the fuel-air mixture is at or above the operating temperature, a starter is controlled to facilitate smooth starting of the diesel engine and to bring the engine speed of the diesel engine into be a steady state value. That is, ignition of the fuel-air mixture may not be successful in an earlier stage of the diesel engine starting in which the diesel engine is as cold as the fuel-air mixture, since compression heat is not sufficient.

As an apparatus for controlling energization to the glow plug, a glow plug energization control apparatus is known. Ideally, the temperature of the glow plug should be rapidly raised up to the ignition temperature of the fuel-air mixture prior to the initial actuation of the diesel engine. The sufficiently heated glow plug serves to heat the fuel-air mixture around the glow plugs up to the ignition temperature.

The step as stated above is generally called a pre-glow or pre-glow step. In the pre-glow step, a large electric power is supplied to the glow plug. When the starter switch is turned on to facilitate starting the diesel engine at the end of the pre-glow step, the diesel engine can be started for smooth and continuous running.

After the temperature of the glow plug has reached to the operating temperature, smaller electric power than that in the pre-glow step is supplied from a battery to the glow plug so as to prevent the temperature of the glow plug from dropping. This step just is called an after-glow or after-glow step. In this after-glow step, it is possible to prevent the occurrence of dropping of the temperature in the combustion chamber of the diesel engine and the occurrence of diesel knock, and to suppress the occurrence of noise and white smoke, the exhaustion of HC composition, and the like because the fuel-air mixture is completely burned.

In the after-glow step, electric power supply to the glow plug is performed under a pulse width modulation (PWM) control. A voltage applied to the glow plug can be changed step-wise between a high level and a low level in a cyclic operation with a short periodic time. A duty ratio is defined as herein the ratio of a time interval when a voltage applied to the glow plug is at high level versus a further time interval when a voltage is at low level. Therefore, a voltage applied to the glow plug under a 100 percent PWM operation is a time-invariant constant. One of the merits of the PWM control is that electric power supplied to the glow plug can be easily adjusted in accordance with the duty ratio.

When the key switch is turned on, a conventional diesel engine control system having a glow plug control apparatus has been adapted to control electric power supply such that electric power is supplied to the glow plug and the glow plug control apparatus. The glow plug control apparatus controls electric power supply from a battery mounted on a vehicle to the glow plug prior to starting the engine in order to heat the glow plug. This leads to the raising of the temperature in a combustion chamber of the diesel engine up to the efficient operating temperature as rapidly as possible. At the same time, the glow plug control apparatus controls electric power supply to actuate the electromagnetic drive actuators of an injection pump to control for adjusting the amount and timing of fuel injection and to control starting of the engine so as to crank up the non-operating engine by supplying electric power to the starter in accordance with the results of monitoring the engine conditions.

Usually, a large inrush current is applied to the glow plug and the starter immediately after starting flowing electric current through them. Sometimes a large inrush current can be passed through the glow plug on the order of several ten times the steady state electric current.

Recently, low-rated-voltage type glow plugs are widely used in order to improve the start-up reliability and the rate of rise of the glow plug temperature even in the situation where an applied voltage is low due to the low capacity of a battery mounted on a modern highly-electronified vehicle. However, the very large inrush current is unavoidably applied to the low-rated-voltage type glow plugs because of the low initial resistance thereof.

In actuating the engine when generators which are driven by the rotary torque from the engine can not output any electric power, actuators for starting up the diesel engine such as glow plugs, starters, and injectors for fuel injection are supplied electric power from only the battery. The battery does not generally have redundant capacity.

Therefore, in very cold weather, an internal electric resistance of the battery is increased. This phenomena leads to the reduction of an output voltage of the battery, and to the failure of starting up the diesel engine since the glow plugs and the starter can not be supplied enough electric power from the battery to work efficiently.

Even when the output voltage of the battery is kept at a normal level, coinciding the starting timing of both preheating of the glow plug and starter ignition may result in expediting the consumption of the battery because of the large scale of the inrush current flowing through both the glow plug and starter. The starter can facilitate starting engine by outputting a sufficiently large torque. However in this case, the diesel engine may sometimes fail to start since sufficient electric power for heating the glow plug and for driving the starter is not obtained.

One of the methods for overcoming the above mentioned difficulties is to increase the battery size to improve the battery capacity. It is difficult to use this method because there is no room for the bigger battery to be located in the engine room for the modern complicated engine system.

Accordingly, it is required to adjust electric power supply to the glow plug, the starter, and the actuators for starting up the diesel engine for the sake of working all of these elements well.

A method for reducing the load on the battery is disclosed in Japanese Patent Laid-Open 2003-65195, U.S. Pat. No. 6,722,334, and German Patent Publication No. 10138997. This method is designed so that actuation of the starter is delayed beyond the beginning of the preheating such that the preheat peak load occurs before the starter peak load.

A diesel engine control system for reducing the load on the battery is disclosed in Japanese Patent Laid-Open 9-032606 and British Patent First Publication No. 2,303,470. In this diesel engine control system, electric power from the battery is not supplied to the fuel injection actuators until an energization-stop time after the glow plug has been switched on. The energization-stop time is calculated based on the cooling water temperature of the diesel engine. If the starter switch is turned on within the energization-stop time, the controller of this diesel engine control system starts supplying electric power to the fuel injection actuator from the battery.

A further method for reducing the load on the battery is disclosed in U.S. Pat. No. 6,637,932 and Korean Patent Publication No. 2002-0022359. In this method, electric power supply to the glow plug is controlled based on injected fuel, engine speed and cooling water temperature so as to prevent unnecessary electric power consumption of the battery even after the engine successfully starts.

An operator of the vehicle usually turns the switch on to attempt to start the engine. Thus, he or she does not consider the status of the battery which supplies electric power to the glow plug.

Therefore, when the glow, plug controller is designed, for example, to delay actuation of the starter as mentioned above, the operator's attempt for starting the engine dose not coincide with the timing of actuation of the starter. In this case, the operator of the vehicle often turns off the starter switch and immediately turns it on again because he has the mistaken recognition that the engine trouble was occurred. This leads to unnecessary electric power consumption of the battery.

In a case where the low-rated-voltage type glow plug is used and all the starting timing of preheating the glow plug, starter ignition and injectors for fuel injection coincide, or in further case where the excess inrush current flowing through the glow plug is not suppressed sufficiently after the preheating peak load occurs, it is impossible to start up the diesel engine because, in addition to a large inrush current supplied to the starter, another large current is required to start the actuators for starting up the diesel engine. In this situation however another large current can not be obtained from the battery.

Besides, when electric power is supplied to the glow plug during the pre-glow step for only starting the engine, the surrounding temperature of the glow plug, such as the temperature of an engine block and a main body metal fitting, remains at a low level just after the engine is started. Then the temperature of the glow plug is dropped since the temperature of the glow plug is absorbed by these elements. In this state, even if the key switch is put in a start position to start cranking, the engine is hard pressed to start smoothly since the temperature of the fuel-air mixture dose not reach at the operating temperature, or diesel knock and incomplete combustion may occur.

SUMMARY OF THE INVENTION

The present invention has been made in view of the above mentioned circumstances, and has an object to provide a glow plug control apparatus for controlling supply of electric power to both a glow plug and a starter from a power source, the starter assisting start of the engine by using the glow plug. The control apparatus comprises a starter switch allowing the electric power to be supplied to both the glow plug and the starter from the power source when the engine is cranked, a detecting device detecting a state of the engine, a calculating circuit calculating a pre-glow time, an after-glow time, a delay time. The delay time depends on both the detected state of the engine detected by the detecting device and a timing when the starter switch is turned on thereof, the delay time being defined as a time interval between a first time moment when the starter switch is turned to the power-on position and a second time moment when the electric power is started to be supplied to the glow plug. The pre-glow time is defined as a time interval during which the electric power is supplied to the glow plug so that temperature of the glow plug is raised. The after-glow time is defined as a time interval during which the electric power is supplied to the glow plug after the engine is started, and a control circuit controlling the supply of the electric power to both the glow plug and the starter based on the delay time, the pre-glow time, and the after-glow time which are calculated by the calculating device.

Further, in the glow plug control apparatus according to the present invention, the control circuit includes a controlling component controlling the supply of the electric power to both the glow plug and the starter such that the second time moment does not coincide with the first time moment, when the electric power is started to be supplied to the starter.

Further, the present invention has an object to provide a method for controlling supply of electric power to both a glow plug and a starter from a power source, the starter assisting start of the engine by using the glow plug. The method comprises steps of detecting a state of the engine, calculating a pre-glow time, an after-glow time, a delay time. The delay time depends on both the detected state of the engine and a timing when the starter switch is turned on thereof. That is, the delay time is defined as a time interval between a first time moment when the starter switch is turned to the power-on position and a second time moment when the electric power is started to be supplied to the glow plug. The pre-glow time is defined as a time interval during which the electric power is supplied to the glow plug so that temperature of the glow plug is raised. The after-glow time is defined as a time interval during which the electric power is supplied to the glow plug after the engine is started, and controlling the supply of the electric power to both the glow plug and the starter based on the calculated delay time, pre-glow time, and after-glow time.

BRIEF DESCRIPTION OF THE DRAWINGS

In the accompanying drawings:

FIG. 7 shows a time chart according to the first embodiment of the present invention in a case where a starter switch is turned on just after key switch is turned on;

FIG. 8 shows a time chart according to the first embodiment of the present invention in a case where turning a starter switch on is delayed by a calculated duration time from turning a key switch on;

FIG. 11 shows a time chart according to the second embodiment of the present invention in a case where turning a starter switch on a power-on position is delayed by a calculated duration time from turning key switch on;

FIG. 12 shows a time chart according to the second embodiment of the present invention in a case where turning a starter switch on a power-on position is delayed by a shorter time than a calculated duration time from turning a key switch on;

FIG. 13 shows a time chart according to the second embodiment of the present invention in a case where turning a starter switch on is delayed by a predetermined time for which electric power is supplied to the glow plug from turning a key switch on;

DETAILED DESCRIPTION OF THE PREFERRED EMBODIMENTS

Various embodiments of the present invention will now be described hereafter with reference to the accompanying drawings.

First Embodiment

Referring to FIGS. 1 to 9, 16 to 17, a first embodiment of a glow plug energization apparatus will now be described.

Figure 1:
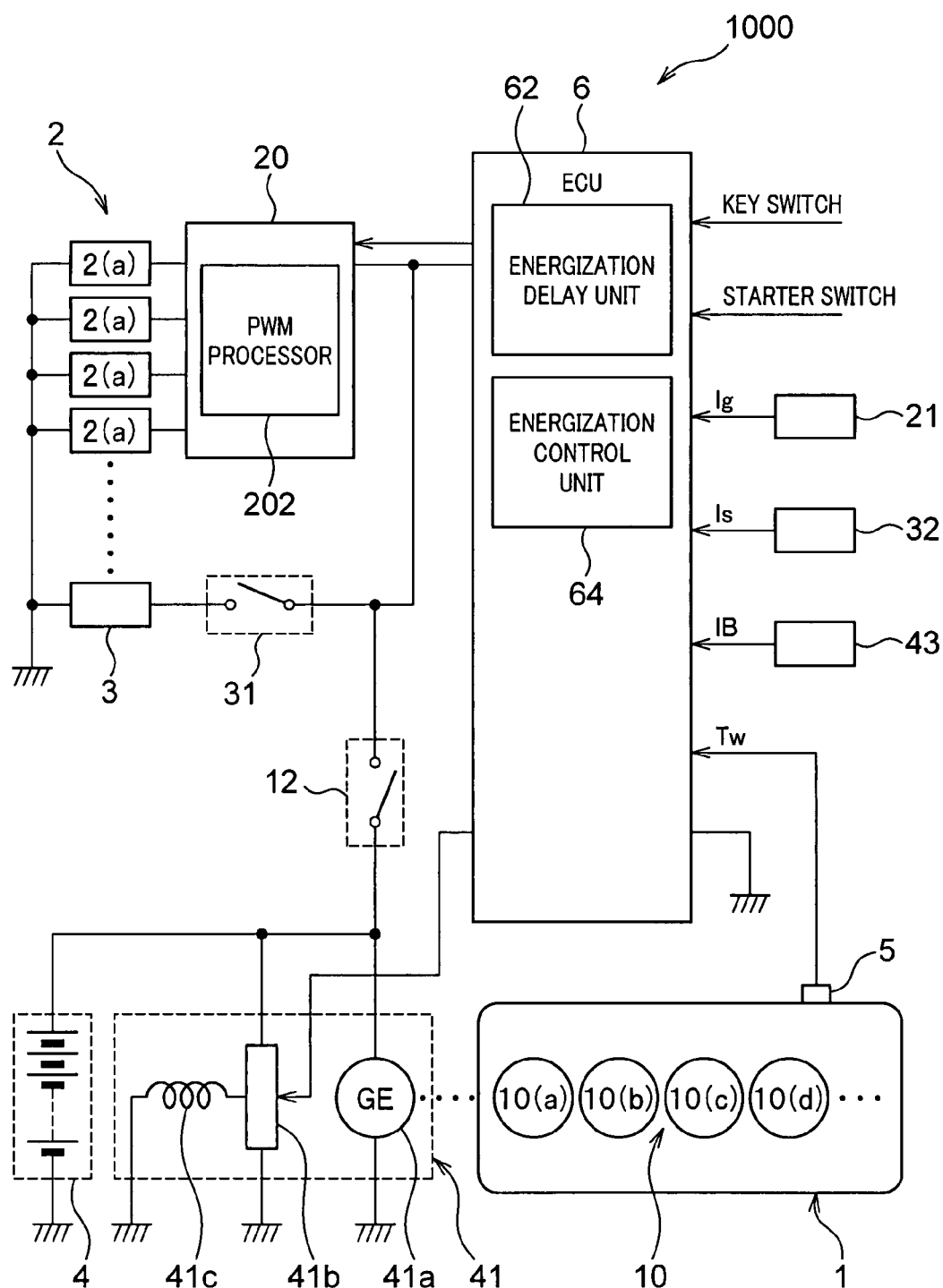
FIG. 1 is a block diagram which shows a glow plug energization apparatus connected to a diesel engine according to the present invention.
Figure 16:
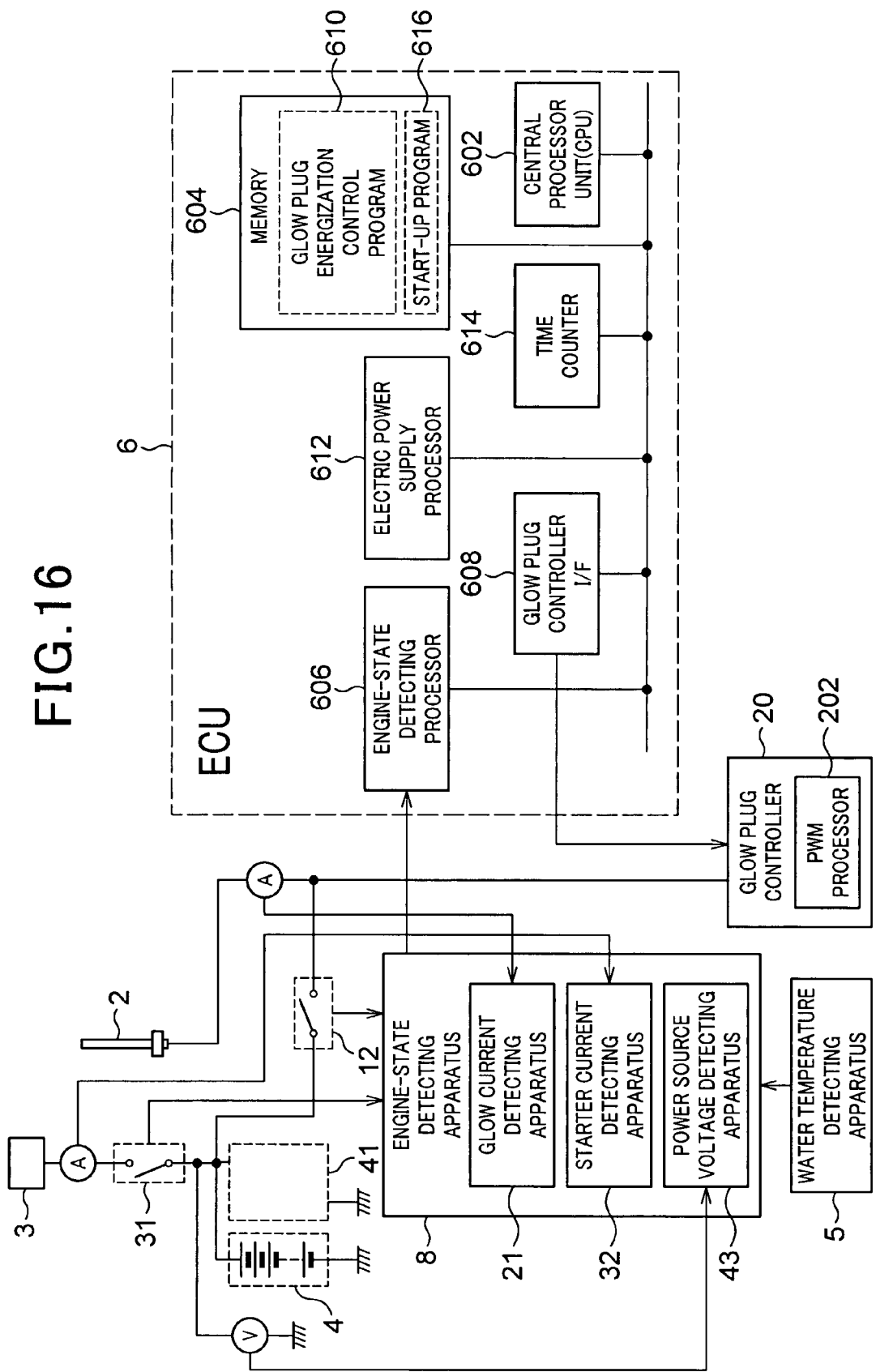
FIG. 16 is a block diagram which shows a construction of an electric control unit (ECU) in more detail than that shown in FIG. 1 according to the present invention.

FIGS. 1 and 16 show a glow plug energization control apparatus 1000 according to the present invention and a diesel engine 1 (hereinafter, is abbreviated as "engine" for simplicity). The glow plug energization control apparatus is connected to the engine 1. The glow plug energization control apparatus 1000 according to the present invention includes, a glow plug controller 20 for controlling a voltage applied to glow plug using pulse width modulation (PWM) method, an electronic control unit (ECU) 6, an alternator 41, a battery 4, a power-source voltage detecting apparatus 43 for detecting a voltage outputted from the power source, a glow current detecting apparatus 21 for detecting current injected to the glow plug, a starter current detecting apparatus 32 for discriminating current injected to the starter, an engine water temperature detecting apparatus 5 for detecting a temperature of cooling water of the engine 1. The power-source voltage detecting apparatus 43 is, for example a voltmeter. The power-source detecting apparatus 43 is electrically connected to the ECU 6 and electric signals including information detected thereby is outputted towards the ECU 6. The power-source voltage detecting apparatus 43 is one of components of a power-source voltage detecting means. The glow current detecting apparatus 21 and the starter current detecting apparatus 32 are, for example, ammeters. The engine water temperature detecting apparatus 5 is, for example, a water temperature gauge. The glow current detecting apparatus 21, the starter current detecting apparatus 32, and the engine water temperature detecting apparatus 5 are one of components of a glow current detecting means, a starter current detecting means, and an engine water temperature detecting means, respectively. Further, the glow current detecting apparatus 21, the starter current detecting apparatus 32 and the engine water temperature detecting apparatus 5 form part of an engine-state detecting device form one of components of an engine-state detecting means.

The diesel engine 1 has combustion chambers 10 inside cylinders (not shown) of the diesel engine 1. A mixture of fuel and compressed hot air, i.e., a fuel-air mixture, is ignited inside the combustion chambers 10(a), 10(b), 10(c), 10(d), . . . . Each of glow plugs 2(a), 2(b), . . . is mounted in the respective cylinders. The glow plug 2 is partially extended into the combustion chamber of the cylinder head of the diesel engine 1. The glow plug 2 is used as a heater to bring the temperature of the fuel-air mixture up to an operating temperature and to assure fuel ignition inside the combustion chamber. A pressure of the fuel-air mixture is compressed or regulated by a pressure regulating means (not shown) being provided to a common rail apparatus (not shown), and the fuel-air mixture is injected towards the combustion chamber 10 via an injector (not shown). The glow plugs 2 sometimes have a low rated voltage which allows rapid heating at a low battery voltage during cranking of the diesel engine 1. This type of the glow plugs has a large initial resistance which leads to a large inrush current though the glow plug just after initiation of energization of the glow plug 2.

A starter 3 is connected to the engine 1 and is used to crank the engine 1 during starting up of the engine 1.

The battery 4 and the alternator 41 are connected not only to the glow plug 2 and the starter 3, but also to the common rail apparatus and the injector. The battery 4 is connected to the starter 3 via a key switch 12 and a starter switch 31.

As a rule, the battery 4 acts as a power source for supplying electric power to these equipments, i.e., the glow plugs 2, the starter 3, the common rail apparatus, the injector and so on, irrespective of whether the engine 1 is started or not.

The alternator 41 serves as a further power source for supplying electric power to the equipments after the engine 1 is started. The alternator 41 has an armature 41a, regulator 41b, and a magnetic solenoid 41c. The armature 41a of the alternator 41 is interlocked with a power shaft of the engine 1. An electromotive force is generated when the armature 41a is rotated by the torque from the power shaft of the engine 1. The electromotive force is used to adjust a total output voltage of the battery 4 and the alternator 41 to be constant by a manner where the battery supplies some amount of electrical charge towards the magnetic solenoid 41c and vice versa.

The engine-state detecting means is provided by an engine-state detecting apparatus 8. The engine-state detecting apparatus 8 is constructed from at least one of the power-source detecting apparatus 43, the glow current detecting apparatus 21, the starter current detecting apparatus 32, and the engine water temperature detecting apparatus 5. The engine-state detecting means obtains information about a surrounding environment of the engine 1, running status, such as a rotation speed and a fuel-air ratio, of the engine 1, and other mechanical and physical quantities related to the engine 1.

The power-source voltage detecting means constructed from the power-source voltage detecting apparatus 43 measures a battery-voltage +B of the battery 4 and/or the alternator 41. The glow-current detecting means formed by the glow plug detecting apparatus 21 measures a flowing current Ig through the glow plug 2. The starter current detecting means formed by the starter current detecting apparatus 32 measures a flowing current Is through the starter 4. The engine water temperature detecting means formed by the engine water temperature detecting apparatus 5 measures a cooling water temperature of the engine 1.

Figure 17:
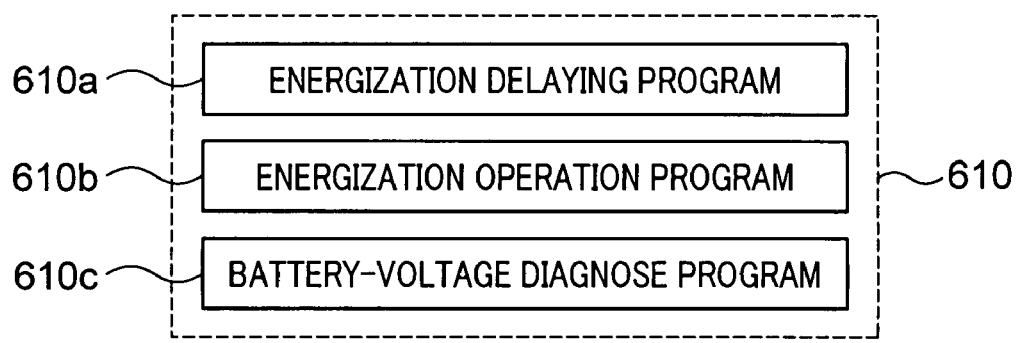
FIG. 17 is a block diagram of a glow plug energization control program according to the first embodiment of the present invention.

As shown in FIGS. 16 to 17, the ECU 6 has at least a central processor unit (CPU) 602, a memory 604, an engine-state detecting processor 606, a glow plug controller interface 608, a glow plug energization control program 610, an electric power supply processor 612, and a time time counter 614. A start-up program 616 which is carried out when the starter switch is turned on and the glow plug energization control program 610 is stored in the memory 604. The ECU 6 and the glow plug energization control program 610 form a calculation circuit and a control circuit.

The engine-state detecting processor 606 receives a key switch signal from the key switch 12 indicating that the key switch 12 has been turned on, a starter signal from the starter 4 indicating that the starter 4 has been actuated, and other electric signals containing information about the power-source voltage +B, the glow current Ig, the starter current Is, the cooling water temperature Tw and so on. These electric signals are transformed into the digital signals which can be dealt with the CPU 602. Some parts of the digital signals are recognized as input parameters of the glow plug energization control program 610 stored in the memory 604. Among information signals about the states of the engine 1, the engine-state detecting processor 606 of the ECU 6 is set to automatically receive the starter signal outputted from the starter when the starter switch is turned on.

The glow plug energization control program 610 has at least an energization delaying program 610a for stopping the supply of electric power to the glow plug 2 for a calculated duration time, and an energization operation program 610b for controlling electric power supply to the glow plug 2, the starter 3, and other electrical apparatus. Furthermore, the glow plug energization control program 610 has a battery-voltage diagnose program 610c. The battery-voltage diagnose program 610c is used to judge whether or not a battery-voltage +B measured by the power-source voltage detecting apparatus 43 is normal.

The energization delaying program 610a calculates the duration time during which electric power is not supplied to the glow plug 2 after the starter 3 is actuated, and controls the glow plug controller 20 via the glow plug controller interface 608 such that electric power is not supplied to the glow plug 2 after the starter 3 is actuated. The duration time is calculated based on an engine state detected by the engine-state detecting means after the engine-state detecting processor 606 of the ECU 6 has recognized that the starter 3 is actuated.

An energization delaying unit 62 includes at least the engine-state detecting processor 606, CPU 602, memory 604, the energization delaying program 610a, and the glow plug controller interface 608.

The glow plug controller 20 adjusts voltage applied to the glow plug 2 in response to a control signal outputted from the ECU 6. The glow plug controller 20 is configured to operate a PWM control using a PWM processor 202. In a modification, the glow plug controller 20 is placed in the ECU 6, that is, the ECU 6 further comprises the glow plug controller 20.

An energization delaying operation means is constructed of at least the energization delaying unit 62 and the glow plug controller 20.

An energization delaying operation program 610b needs input data which includes information contained in the electric signal outputted from at least one of the engine-state detecting means to the glow plug controller interface 608. The voltage from the battery 4 and/or the alternator 41 applied to the glow plug 2 is adjusted by the electric power supply processor 612 in accordance with results obtained by executing the energization delaying program 610b.

An energization control unit 64 is constructed of at least the engine-state detecting processor 606, CPU 602, memory 604, the energization delaying operation program 610b, and the electric power supply processor 612.

The operations and advantages of the glow plug energization control apparatus 1000 according to the present embodiment will now be described.

The glow plug energization apparatus 1000 is actuated when the key switch 12 is turned on and the engine-state detecting means, the ECU 6, and the glow plug controller 20 are supplied electric power from the battery 4.

The time counter 614 of the ECU 6 is reset to an initial value when the key switch signal or the starter signal are inputted, and starts counting a passage time from a moment when the key switch is turned on.

After the glow plug energization apparatus 1000 according to the present embodiment is actuated, the ECU 6 receives results of measurement from the engine water temperature detecting apparatus 5 and the power-source voltage detecting apparatus 43 in order to calculate a delay time td, a pre-glow time tp, and an after-glow time ta by executing the energization delaying program.

The delay time td is defined as a time interval between a moment when the starter switch 31 is turned on and a further moment when electric power is set to be supplied to the glow plug 2.

The pre-glow time tp is defined as a time interval between a moment when the starter switch is turned on and a further moment when electric power is set to be supplied to the glow plug 2 for heating the glow plug 2. It is preferable that the glow plug temperature is rapidly raised up to a target temperature during the pre-glow time. The sufficiently heated glow plug 2 can bring the temperature of the fuel-air mixture to the operation temperature so that the glow plug 2 automatically assures the fuel-air mixture ignition.

The after-glow time ta is defined as a time interval between a moment when the engine 1 is started and a further moment when electric power supply to the glow plug 2 is ended. The rotation of the engine 1 can be stabilized by this electric power supply to the glow plug 2 during the after-glow time.

Each of the delay time td, pre-glow time tp, and the after-glow time ta depends on both the engine water temperature Tw and the battery voltage +B. These dependences are shown in FIGS. 2A to 2C.

At extremely low temperature state, both the engine water temperature Tw and the electromotive force +B of the battery 4 are lowered. In the situation where it is hard to start the engine 1, as shown in FIG. 2A, the pre-glow time tp is set to be relatively long. Similarly, as shown in FIGS. 2B and 2C, both the after-glow time ta and the delay time td are set to be relatively long.

Figure 2A:
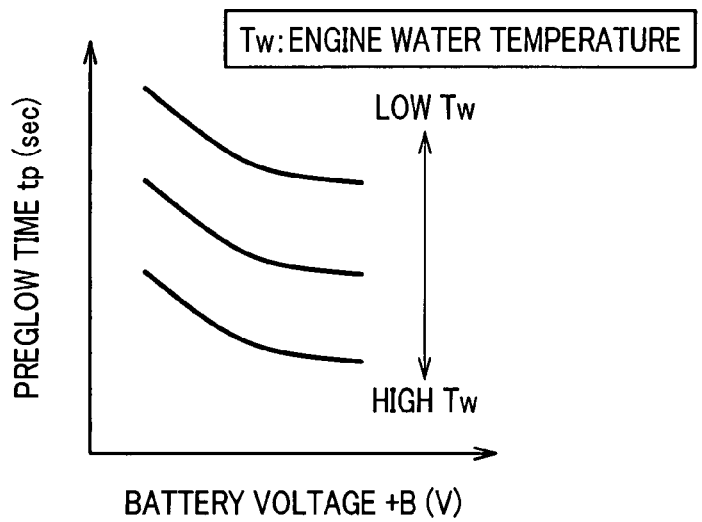
FIG. 2A shows some relations as a function of the cooling water temperature of the engine between the pre-glow time and the battery voltage.
Figure 2B:
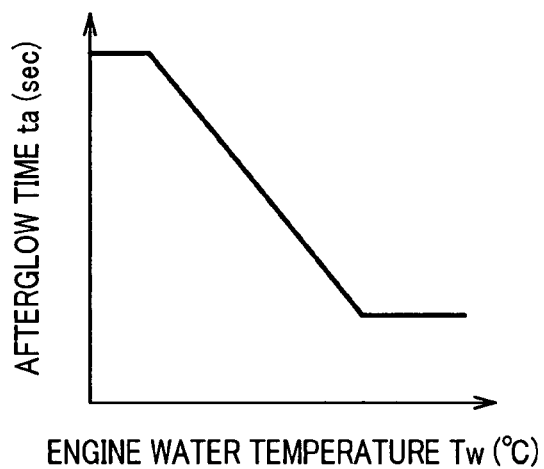
FIG. 2B shows a relation between the after-glow time and the cooling water temperature.
Figure 2C:
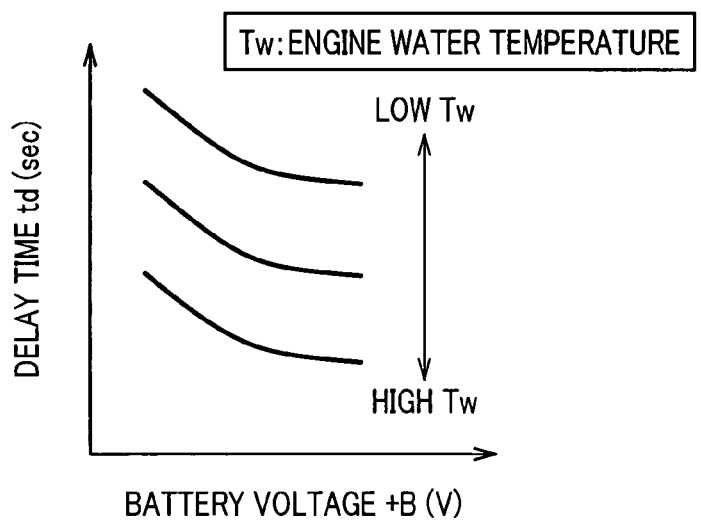
FIG. 2C shows some relations as a function of the cooling water temperature of the engine between the duration time and the battery voltage.

In the situation where the engine 1 is re-started shortly after the engine 1 has been stopped, since the engine water temperature Tw is kept at a high level, as shown in FIGS. 2A, 2B, 2C, all of the pre-glow time tp, the after-glow time ta, and the delay time td are set to be short.

The starter 3 is operated by a driver of the vehicle. If the starter switch 31 is turned on by the driver, the starter 3 is actuated, and if the starter switch 31 is turned off by the driver, the starter 3 is stopped. In other words, there is nothing to limit a driver's operation of actuating the starter 3. The driver of the vehicle can open and close the starter switch 31 whenever necessary.

After the starter 3 is actuated, electric power is not supplied to the glow plug 2 until time counted by the time counter 614 elapses the delay time td. That is, the battery 4 supplies electric power is only to the starter 3 for cranking the engine 1.

The energization of the glow plug 2 is controlled by the energization delaying operation means and is delayed for the delay time td.

In this case, heat of compression generated during cranking by the starter 3 causes the temperature of the glow plug 2 to rise even when the engine is cold before cranking. Then, inrush current through the glow plug 2 can be lowered because internal resistance increases with temperature.

After lapse of the delay time td, the pre-glow step is carried out in which electric power is supplied to the glow plug 2 for easier ignition of the fuel-air mixture easier before the engine 1 is started, i.e. before lapse of the pre-glow time.

After the engine 1 is started or after the pre-glow time tp elapses, the after glow step is carried out in which power is supplied to the glow plug 2 for more stable ignition of the fuel-air mixture for the after-glow time ta.

During the pre-glow step, i.e., a time interval between a moment when the delay time td has been elapsed and a further moment when the engine 1 is started, voltage applied to the glow plug 2 is set either at a value in the full charged state of the battery 4 or at a higher effective value of the battery 4 by the glow plug controller 20 and is controlled under a pulse width modulation (PWM) control.

Figure 14:
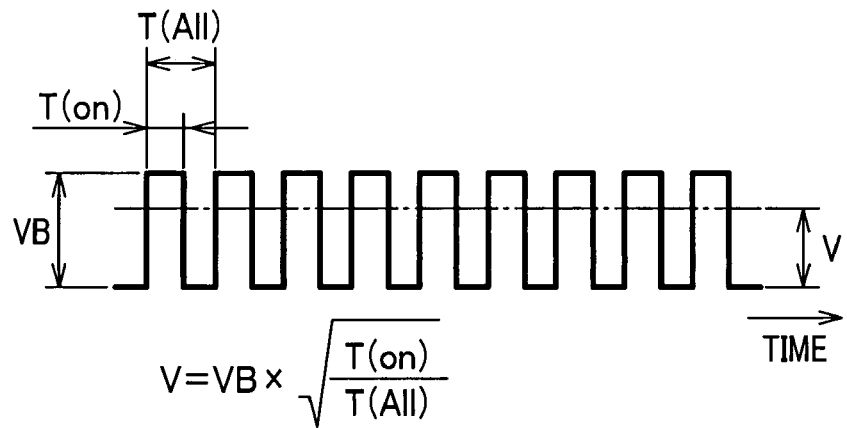
FIG. 14 is a schematic expression of the Pulse Width Modulation (PWM) control in a case where source voltage is constant.
Figure 15:
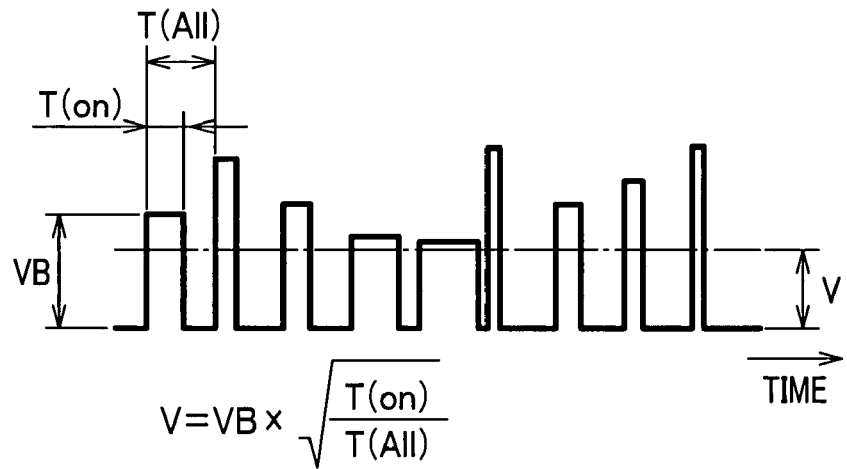
FIG. 15 is a schematic expression of the Pulse Width Modulation (PWM) control in a case where source voltage varies with time.

A PWM energization will be explained below. In the PWM energization, applied voltage is switched on and off rapidly with an arbitrary switching frequency. One of the advantages of the PWM energization is that a higher voltage than the standard voltage of a battery can be applied because the average power delivered is proportional to the switching frequency. As shown in FIGS. 14 and 15, the effective voltage Veff in the PWM energization is defined as using a DC battery voltage Vb, a time fraction it is "on" $t\_on/(t\_on+t\_off)$, $Veff=Vb*$square root of $t\_on/(t\_on+t\_off)$. The applied voltage is time independent constant under the 100% PWM energization control.

During the after-glow step, i.e., a time interval between a moment when the pre-glow time tp has elapsed and a further moment when an additional after-glow time ta to the pre-glow time has elapsed, the alternator 41 runs to generate supplementary electric power. Although voltage of the alternator 41 varies with time, voltage of the alternator 41 is rectified to the smooth effective voltage under the PWM control executed in the glow plug controller 20. Thus, electric power is supplied to the glow plug 2 under the PWM control.

Figure 3:
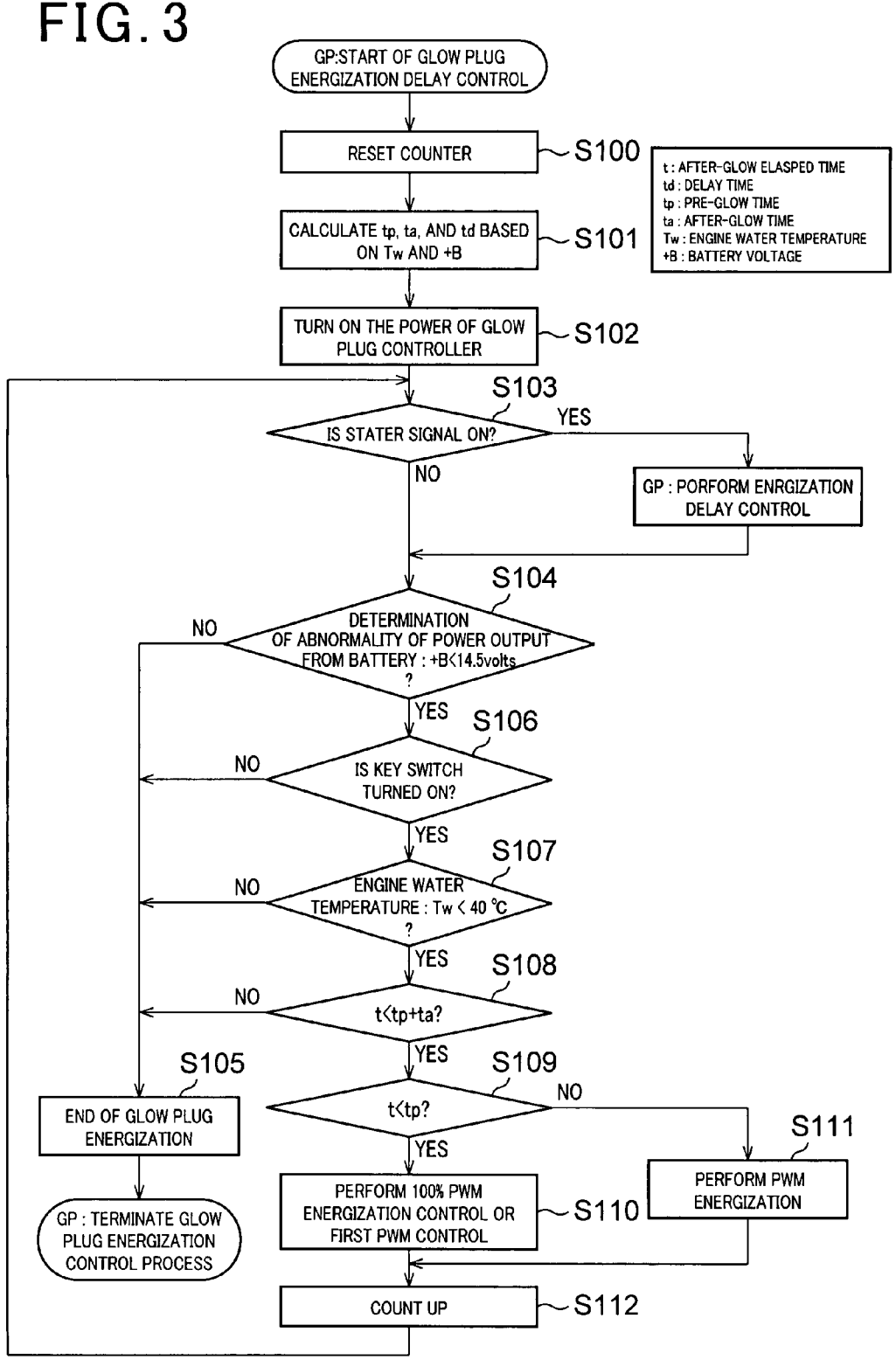
FIG. 3 shows a flowchart of a program to be executed by the glow plug energization control apparatus according to the first embodiment of the present invention.

Referring FIGS. 3, 16, and 17 in which a flow chart of the glow plug energization control means according to the first embodiment of the present invention is illustrated, a sequence of steps will be explained.

The glow plug energization apparatus according to this embodiment of the present invention is actuated when the key switch 12 is turned on and the ECU 6 receives an electric signal from the key switch 12.

At step 100, the time counter 614 of the ECU 6 is reset. Counting a time t is started from when the key switch 12 is turned on. The time t measured by the time counter 614 will be used as a judgment criterion whether or not electric power is supplied to the glow plug 2 in the following steps.

Just after when the glow plug energization control apparatus 1000 is actuated, the time counter 614 is reset under the control which is determined by the start-up program 610c stored in the memory 604 and is performed by the ECU 6.

At step 101, the pre-glow time tp, the after-glow time ta, and the delay time td are estimated based on both the engine water temperature Tw and the power source voltage +B according to the relations illustrated in FIG. 2. At this step, since the engine 1 is not actuated, the power source voltage +B is none other than the battery voltage.

All of these times, i.e, the pre-glow time tp, the after-glow time ta, and the delay time td, are estimated by the ECU 6 with performing the energization delaying program 610a based on inputted signals into the engine-state detecting processor 606 of the ECU 6 from the glow current detecting apparatus 21, the starter current detecting apparatus 32 and the engine water temperature detecting apparatus 5.

At step 102, the glow plug controller 20 is actuated to adjust a condition under which electric power is supplied to the glow plug 2. The glow plug controller 20 becomes ready for supplying electric power to the glow plug 2.

If the starter 4 is started by the vehicle driver during execution of the glow plug energization control means, the starter signal outputted from the starter 4 is received by the ECU 6.

At step 103, it is judged whether the starter signal from the starter 4 is outputted or not. This starter signal can be outputted only once when the starter switch 31 is turned on. Therefore, in this case the judgment is YES at step 103 and the procedure proceeds to an energization delay control process which will be described later in detail. The energization delay control process is functionally carried out by mainly the energization delay unit 62 of the ECU 6, the energization control unit 64, and the glow plug controller 20 using the energization delaying program 610a and the energization control program 610b.

In the energization delay control process, starting electric supply to the glow plug 2 is delayed for the calculated delay time td. If this energization delay control process is completed, the procedure goes to step 104.

At step 104, it is judged whether the battery voltage +B is normal or abnormal based on the measured voltage of the battery 4 or/and the alternator 41 by the power-source voltage detecting apparatus 43. This judgement is functionally carried out by mainly the energization delay unit 62 of the ECU 6 and the glow plug controller 20 using the battery-voltage diagnose program 610c.

The rated voltage of the battery 4 ranges from 12 to 13 volts. If the measured voltage of electric power generated by the alternator 41 exceeds 14.5 volts after the engine 1 is started, it can be considered that over discharge has occurred inside the alternator 41 since some trouble has been caused, such as, breaking down of the regulator 41b.

In this case, it is necessary to immediately stop supply electric power to the glow plug 2 because the glow plug 2 may be broken.

At step 104, it is judged whether or not the power source voltage +B is smaller than 14.5 volts. If the judgment is No at step 104, the procedure goes to step 105 in which supplying electric power to the glow plug 2 is stopped.

The stopping process for supplying electric power to the glow plug 2 is functionally carried out mainly by the ECU 6 and the glow plug controller 20. The ECU 6 outputs command for stopping electric power to the glow plug 2 toward the glow plug controller 20 via the glow plug controller interface (I/F) 608.

If the judgment is YES at step 104, routine proceeds to step 106 in which it is further judged whether the key switch 12 is turned on or not. This judgment is functionally carried out by the ECU 6 based on information obtained by the engine-state detecting processor 606.

At step 106, it is judged whether the key switch 12 is turned on or not. If the key switch 12 is turned off, i.e., the vehicle driver stops the engine starting, the judgment is NO. Therefore, the procedure proceeds to step 105 in which electric power supplied to the glow plug 2 is turned off. The stopping process for supplying electric power to the glow plug 2 is functionally carried out mainly by the ECU 6 and the glow plug controller 20.

At step 106, if the key switch 12 is turned on, the judgment is YES. In this case, the procedure proceeds to step 107 in which it is judged whether or not there is a necessity to supply electric power to the glow plug 2 depending on the states of the engine 1.

At step 107, it is judged whether or not the engine cooling water temperature Tw is lower than 40 degrees Celsius. The cooling water temperature is a representation of one of the states of the engine 1. In the case where it is warm or the engine temperature is raised equal to or above 40 degrees Celsius, the judgment at step 107 is NO. There is no necessity to supply electric power to the glow plug 2. Thereafter, the procedure proceeds to step 105 at which supplying electric power to the glow plug 2 is stopped. This judgment is functionally carried out by the ECU 6 based on information obtained by the engine-state detecting processor 606. The ECU 6 will outputs command signals to control the glow plug controller 20 so as to stop supplying electric power to the glow plug 2.

In the case where the cooling water temperature Tw is lower than 40 degrees Celsius, the judgment is YES. Therefore there is not a necessity to supply electric power to the glow plug 2, and the procedure proceeds to step 108. This judgment is functionally carried out by mainly the ECU 6 and the energization control program 610b.

At step 108, it is judged whether the elapsed time t counted by the time counter 614 of the ECU 6 is shorter than the sum of the pre-glow time tp and the after-glow time ta. In the case where the elapsed time t is shorter than the sum of the pre-glow time tp and the after-glow time ta, the judgment At step 108 is NO, that is, there is no necessity to supply electric power to the glow plug 2. Thereafter the procedure proceeds to step 105 in which supplying electric power to the glow plug 2 is stopped.

At step 108, if the elapsed time t is longer than the sum of the pre-glow time tp and the after-glow time ta, the judgment at step 108 is YES, that is there is necessity to supply electric power to the glow plug 2. Therefore the procedure proceeds to step 109.

At step 109, it is judged whether or not the elapsed time t is shorter than the pre-glow time tp. The judgment at step 108 is used to choice the energization method for supplying electric power to the glow plug 2.

At step 109, if the elapsed time t is within the pre-glow time tp, that is, the judgment is YES, the procedure proceeds to step 110.

At step 110, electric power is supplied to the glow plug 2 from the battery 4 under the 100% PWM energization control or under the PWM energization control in which applied voltage is set at a higher value than the standard value of the battery 4. A command signal for the PWM energization control is outputted from the ECU 6 to the glow plug controller 20 via the glow plug controller I/F 608.

At step 110 if the elapsed time since the starter 3 has been actuated is longer than the delay time td, a large inrush current through the starter 3 has already been sufficiently lowered and a flowing current through the starter 3 is kept at not so large a constant amount. Therefore, it is possible to stably supply electric power towards the glow plug 2 from the batter 4 under the 100% PWM energization control or under the PWM energization control in which applied voltage is set at a higher value than the standard value of the battery 4.

At step 112, after the time counter 614 count the elapsed time, the procedure proceeds to step 103.

On the second arrival at step 103, it is again judged whether the starter signal from the starter 3 is outputted or not. In this case the judgment is NO since the starter signal has already outputted when the starter switch 31 is turned on. Thereafter, the procedure proceeds to step 104.

The steps 104-112 are repeatedly executed until the engine 1 begins to run effectively, that is, the elapsed time t comes to exceed the pre-glow time tp.

As described above, the procedure from step 104 to step 112 includes judging both whether or not it is possible to supply electric power to the glow plug 2 and whether or not there is necessity to supply electric power to the glow plug 2.

At step 109, it is again judged whether or not the elapsed time t is shorter than the pre-glow time tp. If the elapsed time t is larger than tp, the judgment is NO and the procedure proceeds to step 111.

At step 111 where the engine 1 is started, a loop routine composed of step 111, step 112, step 103, step 104, step 106, step 107, step 108, step, 109, and step 111 is repeatedly executed until the calculated after-glow time ta is expended. During this after-glow time ta, electric power is supplied to the glow plug 2 in order to stabilize the running of the engine 1. The process is functionally carried out by mainly the ECU 6 and the energization control program 610b within the after-glow time ta, In the after-glow energization, the effective voltage applied to the glow plug 2 is transformed from the voltage outputted from the alternator 41 under the PWM control operated by the glow plug controller 20. In more detail, the glow plug controller 20 modulates the inputted electric power from the alternator 41 and outputs the electric power towards the glow plug 2. These process are functionally carried out by the glow plug control unit 64.

At the end of the after-glow time ta, the judgment at step 108 comes to be NO. It is not necessary to supply electric power to the glow plug 2. Thereafter, the procedure proceeds to step 105 at which supplying electric power to the glow plug 2 is stopped.

While the key switch 12 is turned on but the starter switch 31 is not turned on, the glow plug energization procedure repeatedly executes steps 103-112, i.e., electric power is supplied only to the glow plug 2.

Thereafter, the starter switch 31 is turned on, and the judgment at step 130 becomes YES. The procedure proceeds to the energization delay control process which will be described later in detail.

Under the energization delay control, electric power supply to the glow plug 2 is delayed for a calculated delay time td. This process is functionally carried out by the ECU 6, the glow plug controller 20, the energization delaying program 610a, and the energization control program 610b. Then the procedure returns to step 104, and thereafter the glow plug energization procedure mentioned above will be done.

Therefore in the case when the starter switch 31 is turned on after the key switch 12 has been turned on, it is possible to provide a reliable method to start the engine 1 according to this embodiment of the present invention.

Referring FIGS. 4 to 6, the glow plug energization delay control process will be described in detail.

Figure 4:
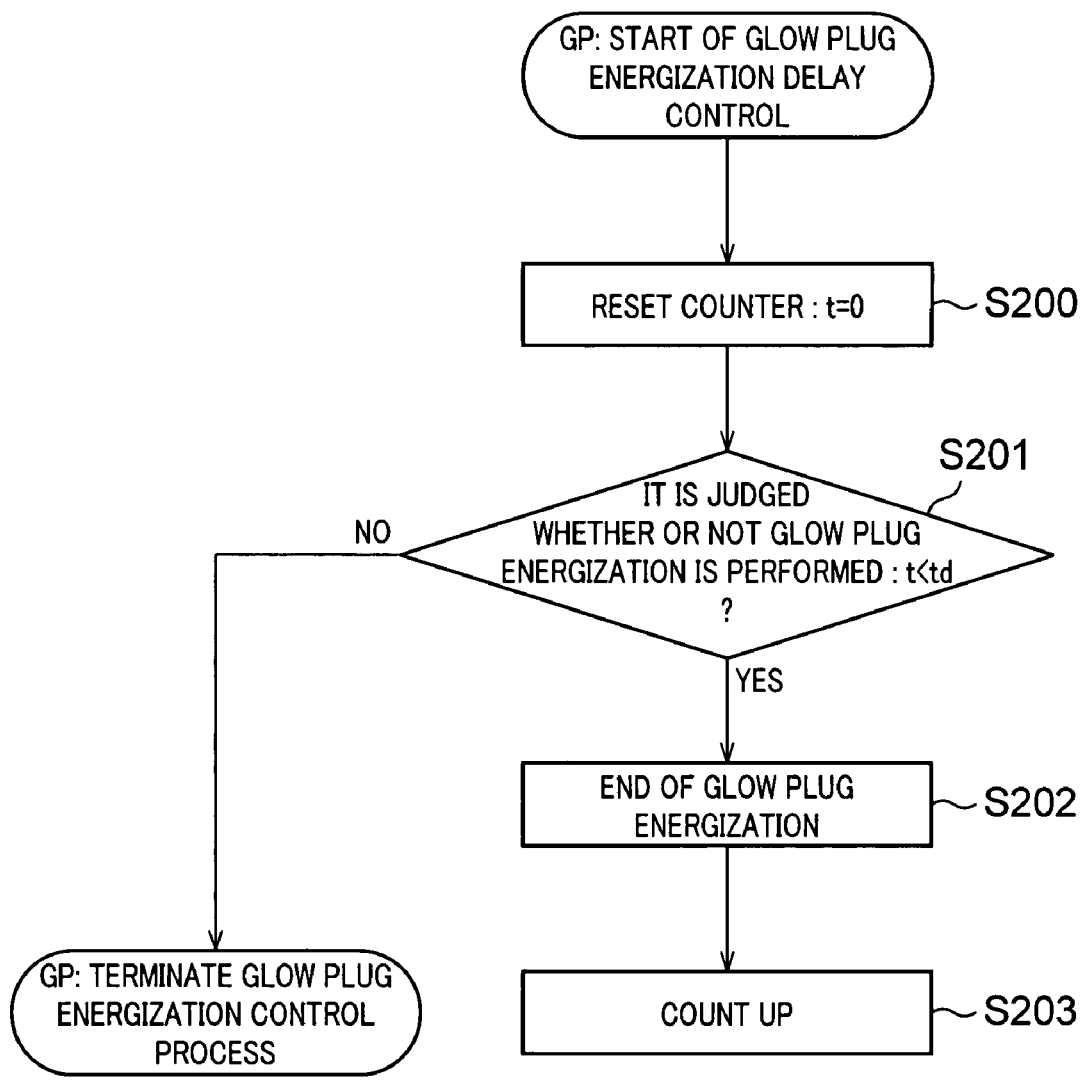
FIG. 4 shows a flowchart of a program of processing the time duration control for supplying electric power to the glow plug which includes a judgment based on an elapsed time, to be executed by the glow plug energization control apparatus according to the first embodiment of the present invention.

In FIG. 4, a flow chart of the glow plug energization control process is shown. If the ECU 6 receives a starter signal from the starter 3, the time counter 614 of the ECU 6 is reset and starts to count the elapsed time from when the starter 4 is actuated.

At step 201, it is judged whether or not the elapsed time t is shorter than the delay time td. If the judgment at step 201 is YES, there is necessity to supply electric power to the glow plug 2.

Figure 5:
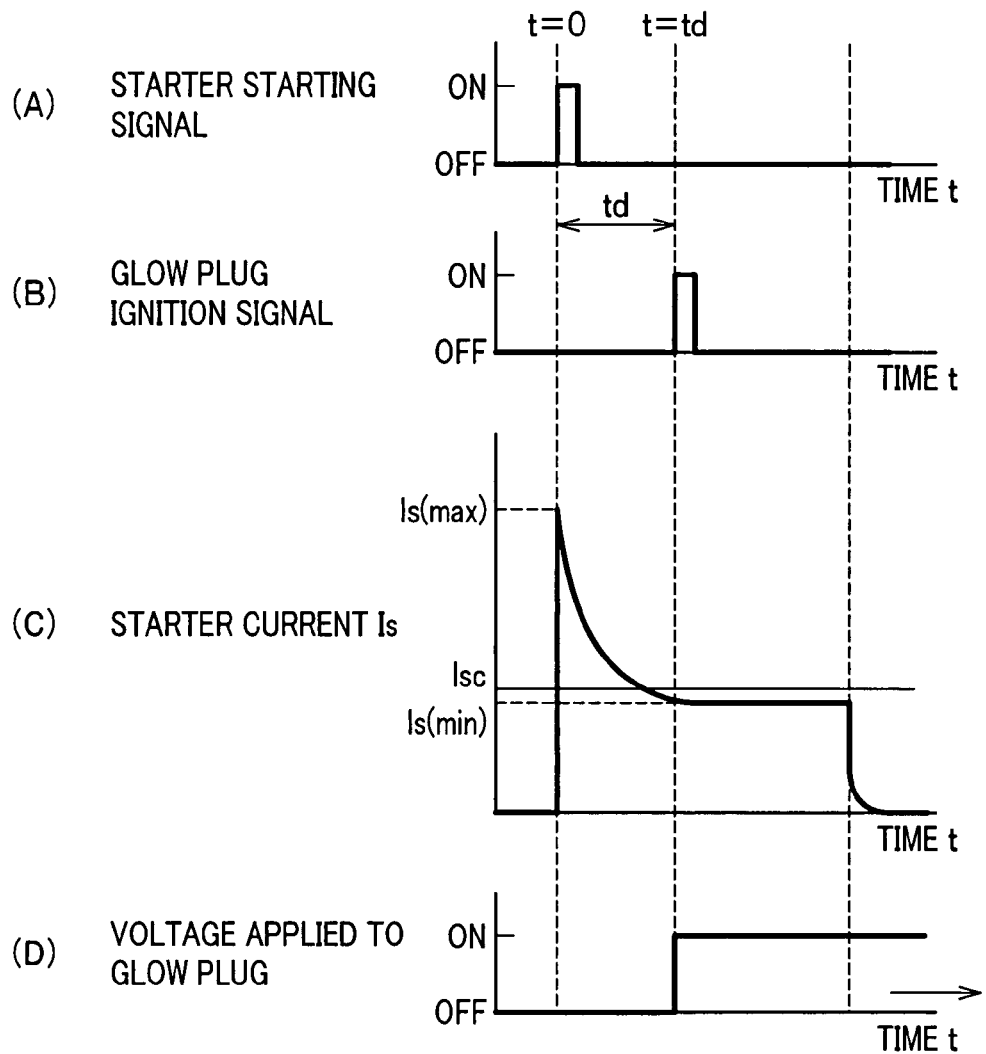
FIG. 5 shows a relation between a time chart of a program of processing the time duration control for supplying electric power to the glow plug, and starter current.

As shown in FIG. 5, during the delay time td after the starter 3 is started, the starter current Is, especially inrush current Is(max) through the starter 3 becomes large.

Therefore, it is needed to delay supply of electric power to the glow plug 2 until the end of the delay time td, that is, until the starter current Is is sufficiently suppressed.

If the judgment at step 201 is YES, the procedure proceeds to step 202 where it is forbidden to supply electric power to the glow plug 2. At step 203, the time counted by the time counter 614 is reset, and the procedure go buck to step 201.

Until the elapsed time t exceeds the delay time td, it is forbidden to supply electric power to the glow plug 2 and thus electric power is not supplied to the glow plug 2 while the procedure of steps 201-203 is repeatedly performed.

As shown in FIG. 5, when the delay time td is passed, the starter current Is decreased to a steady state value Is(min). In this case, electric load to the battery 4 can be suppressed. Therefore, it is possible to actuate the glow plug 2 with sufficient electric power.

When the energization delay control process is completed, the procedure goes back to step 104. Thereafter, it will start to supply electric power to the glow plug 2. This process is functionally carried out by the ECU 6, the glow plug controller 20, the energization delaying program 610a, and the energization control program 610b. Them the time counter 614 counts the elapsed time.

In this embodiment, it is judged whether or not there is a necessity to supply electric power to the glow plug 2 based on the comparison between the elapsed time t and the delay time td.

Figure 6:
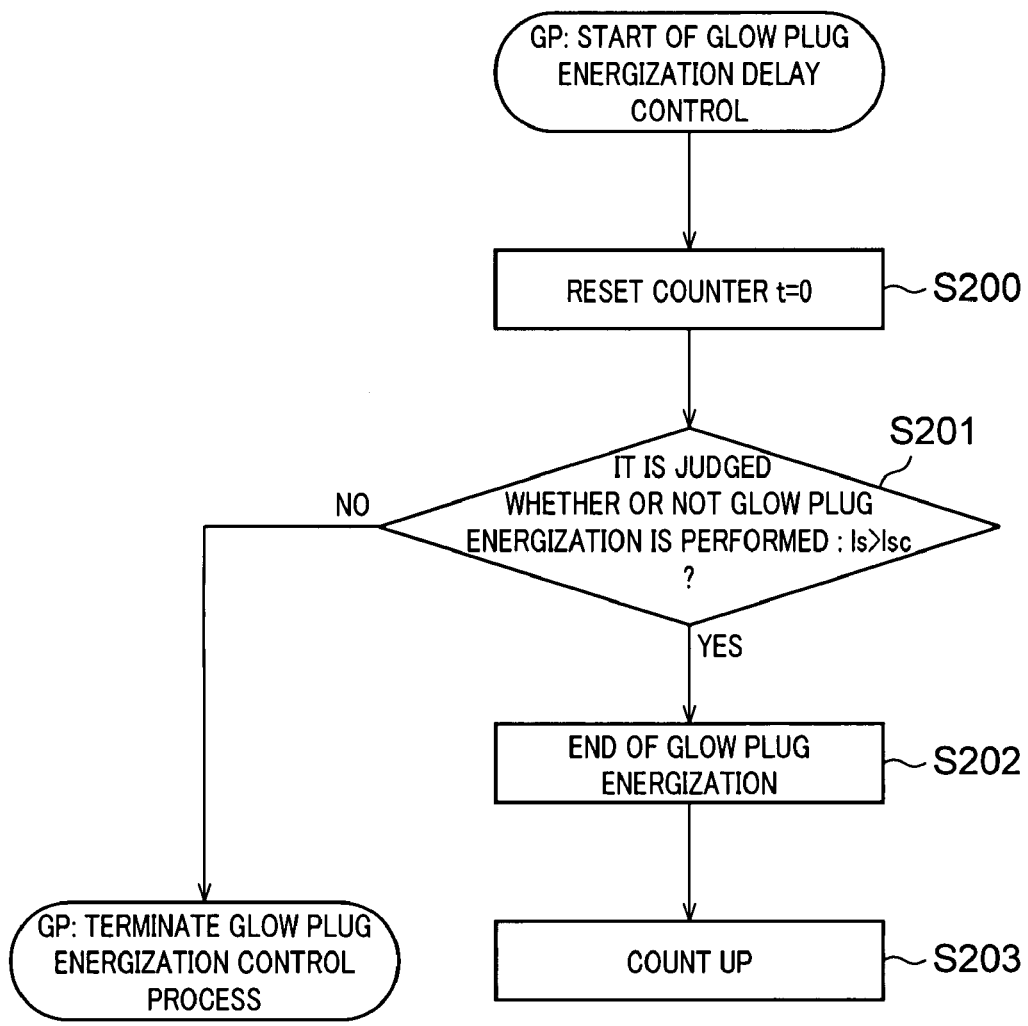
FIG. 6 shows a flowchart of a program of processing the time duration control for supplying electric power to the glow plug which includes a judgment based on starter current, to be executed by the glow plug energization control apparatus according to the first embodiment of the present invention.

As shown in FIG. 6, it is possible to make this judgment based on a starter current Is measured by the starter current detecting apparatus 32. In this case, while the measured starter current is not smaller than the predetermined current Isc, it is forbidden to supply electric power to the glow plug 2. This process is functionally carried out by the ECU 6, the glow plug controller 20, the energization delaying program 610a, and the energization control program 610b. In this case, the judgment whether or not there is a necessity to supply electric power to the glow plug 2 is exercised based on information obtained by the engine-state detecting apparatus 8 not the counter 614. Although the ECU 6 monitors the starter current Is in the above statement, it is possible the ECU 6 judges whether or not there is a necessity to supply electric power to the glow plug 2 based on information other than the starter current Is, for example, the engine water temperature.

Moreover, it is possible to construct the ECU 6 such that the information stored in the memory 604 may be updated constantly and the updated information is used to judge whether or not there is a necessity to supply electric power to the glow plug 2.

Figure 7:
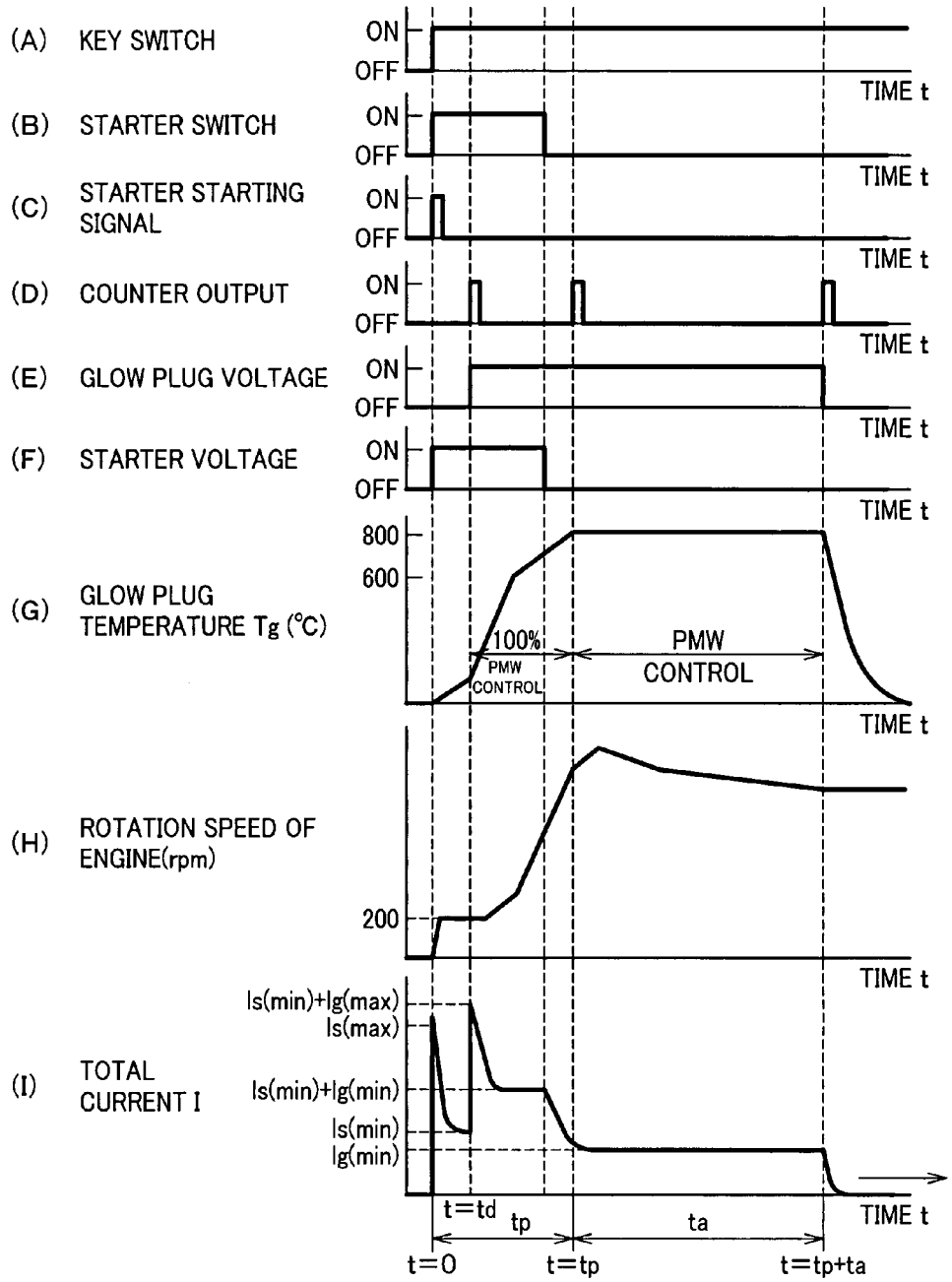

FIG. 7 is the time chart of the energization control method according to the first embodiment of the present invention in the case when the starter switch 31 is turned on shortly after the key switch 12 has been turned on. In FIG. 7, switching timing of the key switch 12 and the starter switch 31, output timing of the starter signal, voltages applied to the glow plug 2 and the starter 31, the glow plug temperature in time Tg, the engine speed in time Ne, and total current are shown.

In a case where the starter switch 31 is turned on shortly after the key switch 12 has been turned on, the starter signal outputted just after from the starter 31 is received by the ECU 6 and the time counter 614 of the ECU 6 starts to count the elapsed time t. The elapsed time is counted by the time counter 614.

Concurrently with this, the starter 31 is actuated. During activation of the starter, the starter current is suppressed to a steady state value Is(min) after a single peak obtained just after the starter switch 31 is turned on.

Since the fuel-air mixture in the combustion chamber 10 of the engine 1 is compressed and heated by cranking, the temperature of the glow plug 2 has already been raised before electric power is supplied.

In the situation where the temperature of the glow plug 2 is not low, an internal resistance of the glow plug 2 is increased. Therefore, when electric power supply to the glow plug 2 is started, inrush current through the glow plug 2 is suppressed.

After lapse of the delay time td is passed, electric power supply to the glow plug 2 in addition to the starter 3. The total current which is the sum of current through both the glow plug 2 and the starter 3 is decreased from the sum total of the steady state starter current and inrush glow plug current to the sum total of the steady state starter current and the steady state glow plug current during the delay time td.

The glow plug temperature is rapidly raised since all of output voltage from the battery 4 is applied to the glow plug 2 until the end of the delay time td. The hot glow plug can allow for assuring ignition of the fuel-air mixture and for giving rise to an initial explosion of the fuel-air mixture. Thereafter, the engine speed Ne of the engine 1 is rapidly increased.

After the engine speed Ne has reached a sufficiently high value, the starter 3 is stopped, and electric power is supplied only to the glow plug 2 under the PWM energization control until the end of the after-glow time ta in order to stabilize the engine speed.

Figure 8:
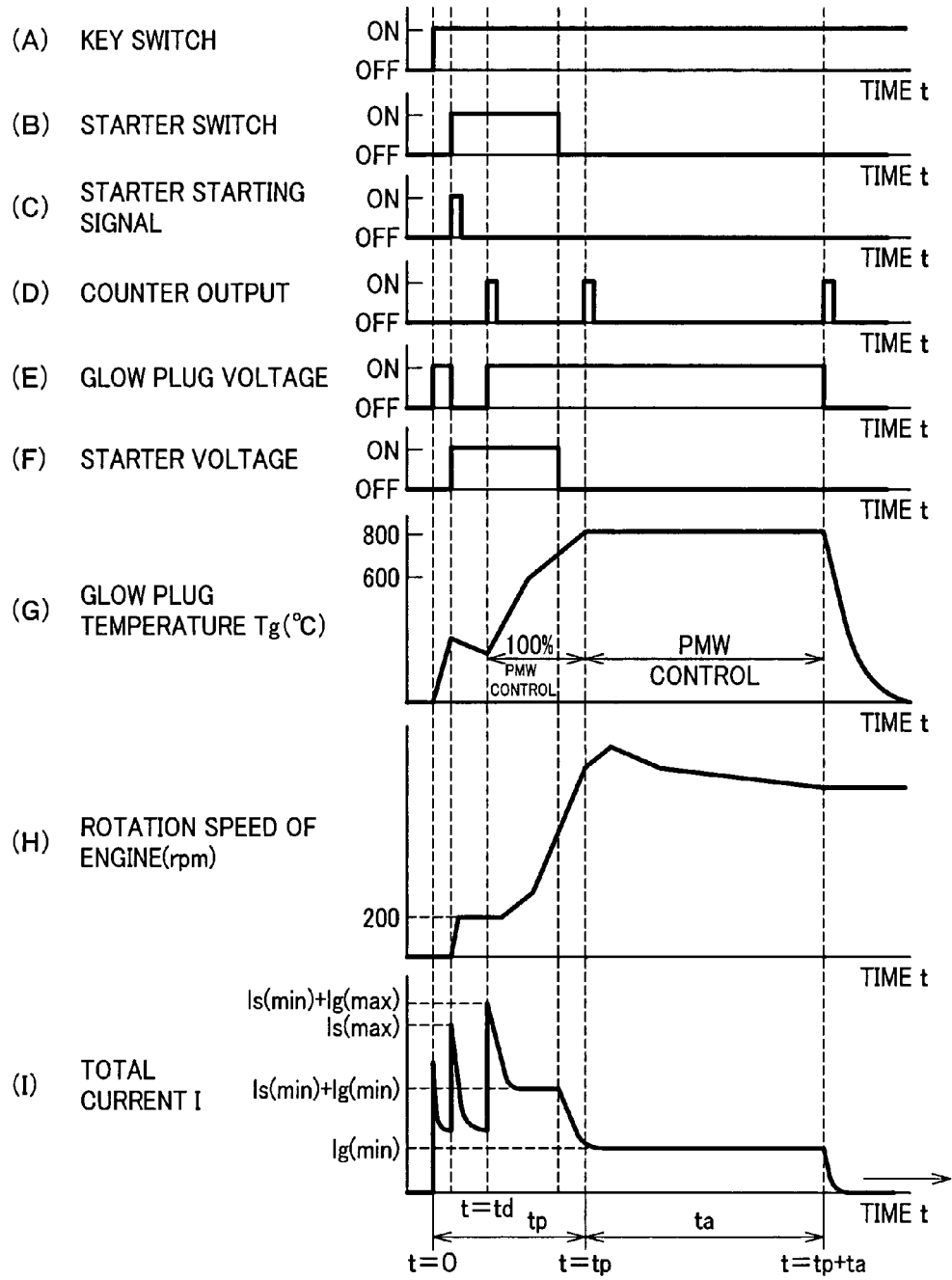

FIG. 8 is the time chart of the energization control method according to the first embodiment of the present invention in the case when the starter switch 31 is turned on some time after the key switch 12 has been turned on. In this case, electric power supply to the glow plug 2 is stopped when the starter switch 31 is turned on. The battery 4 supplies electric power only to the starter 3 with a large inrush current Is(max). Hence the load to the battery 4 can be suppressed.

Thereafter, the process will be done in much the same manner executed in the case where the starter switch 31 is turned on shortly after the key switch 12 has been turned on. When electric power supply to the glow plug 2 is restarted, the starter current has been decreased to the steady state value Is(min). Therefore it can be possible to supply electric power to the glow plug 2 with stability, and the glow plug temperature is rapidly raised.

Figure 9:
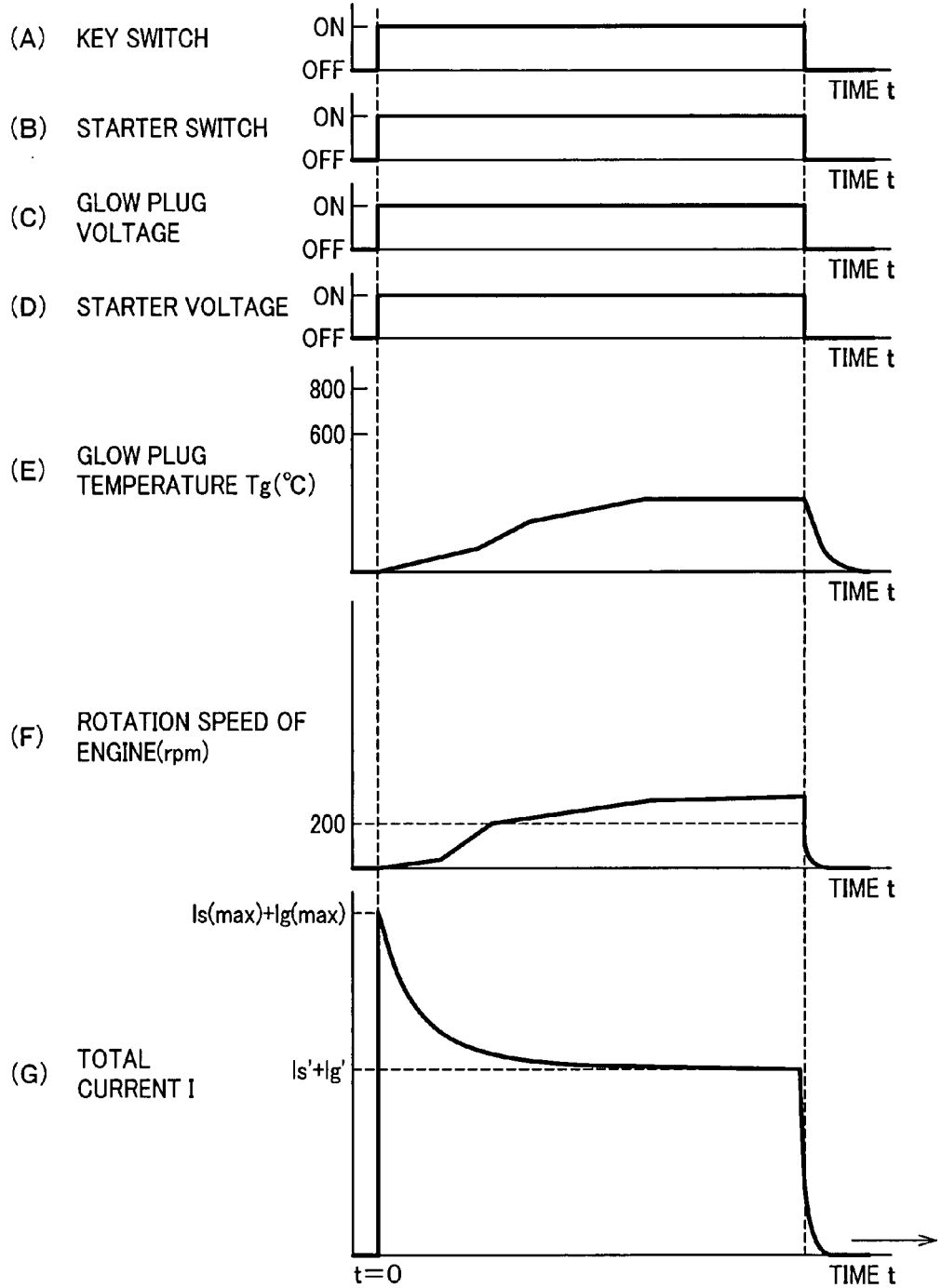
FIG. 9 shows a comparative example in which ignition of the diesel engine is failed.

In FIG. 9, a comparative example is shown. In this comparative example, electric power is started to be supplied to both the glow plug 2 and the starter 3 after the vehicle driver turned the key switch 12 on.

Even though the battery is in the nearly full-charged state, electric power supply simultaneously to both the glow plug 2 and the starter 3 leads to a rapid consumption of the batter 4 since both the inrush glow plug current and the inrush starter current become to be very large. In this situation, it is impossible to supply sufficient electric power to the glow plug 2 and the starter 3. It may occurred that the glow plug temperature is not raised to the operating temperature and the starter speed has not reached a required value. As a result, the activation of the engine 1 fails.

According to the first embodiment of the present invention, it is possible to suppress the consumption of the power source, e.g., the battery 4, owing to the energization delay control method in which the timing for starting the supply of electric power to the glow plug 2 is shifted in time from the timing when the driver of a vehicle turns the key switch on so as to prevent coincidence of the above mentioned two timings. Hence it is possible to stably supply sufficient electric power to the glow plug 2 and the starter 3 and to start the engine 1. Therefore the driver of a vehicle can turn the key switch 12 on at any time.

Furthermore, some parameters of the energization of the glow plug 2, such as the pre-glow time tp, the after-glow time ta and the delay time td, are calculated based on the states of the engine detected by the engine-state detecting means.

Hence the load to the battery 4 can be suppressed because electric power supply to the glow plug 2 is controlled according to the calculated suitable condition on energizing the glow plug 2.

Moreover, the starter current through the starter 3 is rapidly decreased after the peak obtained just after the starter 3 is actuated. As a result, at the end of the delay time td the starter current becomes to be the steady state one which is not so large.

Therefore, after the delay time td which is optimized by the energization control apparatus according to this embodiment, electric power is started to be supplied to the glow plug 2 so as to prevent coincidence of two peaks of the starter current and the glow plug current. Thus since overload of the battery 4 can be avoided, it is possible to stably supply sufficient electric power to the glow plug 2 and the starter 3 and to reliably start the engine 1.

Furthermore, according to the first embodiment of the present invention, the glow plug delay control is executed until the starter current Is is decreased to a predetermined value and below. That is, it is possible to optimize energizing the glow plug 2 based on the starter current Is. In this case, electric power is not supplied until the starter current Is is decreased to a predetermined value. When the decreasing starter current Is from the inrush starter current Is(max) reaches to a predetermined value, electric power is started to be supplied to the glow plug 2 so as to minimize the time loss for heating the glow plug 2 due to the delay in supplying electric power to the glow plug 2. Therefore, it is possible to stably supply sufficient electric power to both the glow plug 2 and the starter 3 and to reliably start the engine 1.

Furthermore, according to the first embodiment of the present invention, if the low-rated-voltage type glow plug is used as the glow plug 2, the temperature of the glow plug 2 can be rapidly raised and the engine 1 rapidly actuated. Even though a large inrush current is flowed through the low-rated-voltage type glow plug, the glow plug energization control apparatus controls electric power supply such that the timing for starting supply of electric power to the glow plug 2 does not coincides with the timing for starting to supply electric power to the starter 3. Therefore, since overload of the battery 4 can be avoided, it is possible to supply sufficient electric power to the low-rated-voltage type glow plug 2 and to take advantage of the low-rated-voltage type of the glow plug 2.

Furthermore according to the first embodiment of the present invention, the power source for electric power supply is the battery 4 mounted on the vehicle when the engine 1 is started, and after that the power source is the alternator 41 in which electric power is generated by the generator 41a connected to the power shaft of the engine 1. During the pre-glow time tp, the glow plug energization means according to this embodiment of the present invention performs operation of the 100% PWM energization control or the first PWM energization control under which a voltage higher than the standard voltage of a power source is outputted. The pre-glow time tp is defined as a time interval between a moment when the starter switch is turned on and a further moment when electric power is set to be supplied to the glow plug 2 for heating the glow plug 2. During the after-glow time ta, the glow plug energization means performs operation the second PWM energization control by which the effective voltage is obtained from the electric power outputted from the alternator 41. The after-glow time ta is defined as a time interval between a moment when the engine 1 is started and a further moment when electric power supply to the glow plug 2 is ended.

In actuating the engine when generators can not output any electric power, the power source is only the battery 4 which does not generally have redundant capacity. The glow plug energization control method controls electric power supply to the glow plug 2 so as to prevent coincidence of two peaks of the starter current and the glow plug current. Thus, overload of the battery 4 can be avoided.

Therefore, since during the pre-glow time tp, the glow plug energization control method performs operation of the 100% PWM energization control or the first PWM energization control under which a voltage higher than the standard voltage of a power source is outputted, it is possible to heat up the glow plug 2 rapidly and to actuate the engine 1 smoothly.

Moreover, after the engine 1 is started, electric power generated by the alternator 41 can be used not only for supplying power to the glow plug 2, the other actuator such as injectors for fuel injection, but also for charging the battery 4. In particular, during the after-glow time ta, the glow plug energization means performs operation of the second PWM energization control by which the effective voltage is obtained from the electric power outputted from the alternator 41.

Therefore, since the glow plug temperature can be kept at a level being prevented from dropping, it is possible to stabilize the engine speed.

Furthermore, according to the first embodiment of the present invention, the glow plug energization control apparatus have the engine-state detecting means. When the ECU 6 detects an abnormal electric signal from the engine-state detecting means, it is possible to stop supply of electric power to the glow plug 2.

For example, the ECU 6 monitors alternator voltage. When the ECU 6 detects an abnormal value of alternator voltage, the ECU 6 stops supply of electric power to the glow plug 2. Thus it is possible to protect the glow plug 2.

According to the first embodiment of the present invention, when the driver of the vehicle turns the key switch 12 on without considering pre-heating the engine by the glow plug 2, the energization delay control method shifts the timing for starting to supply electric power to the glow plug 2 from the timing for starting to supply electric power to the starter 3 so as to prevent coincidences of the above mentioned two timings. Therefore electric power supplied to the glow plug 2 is not affected by the existence of the starter which has large inrush current. Furthermore the diesel engine can be actuated rapidly. Even in a very cold climate, electric power supply to the glow plug 2 is optimized based on the states of the engine 1. Therefore it is possible to suppress the load of the battery 4 and to improve the life of the glow plug 2.

Therefore, even when the driver of the vehicle turns the starter switch 31 on without considering the electric power supplying t to the glow plug 2, it is possible to actuate the engine 1 since sufficient electric power is supplied to the glow plug 2.

Second Embodiment

Referring to FIGS. 1, 10 to 13, 16, and 18 a second embodiment of a glow plug energization apparatus will be now described. In the second embodiment, the same reference numerals will be given to the identical and similar components in structures and/or functions to those in the first embodiment for the simplicity.

In the case where a timing when the starter switch 31 is not turned on is delayed for some time since the key switch 12 has been turned on, it may be happened that the temperature of the glow plug 2 has been sufficiently raised and the glow plug current flowing through the glow plug 2 has been decreased.

In this situation, it is not necessary to forbid the electric power supply to the glow plug 2 before the starter 3 is actuated.

The glow plug energization control apparatus according to the second embodiment of the present invention is connected to the diesel engine (hereafter is abbreviated as "engine" for simplicity).

As shown in FIGS. 1 and 16, the glow plug energization apparatus 1000 according to the second embodiment of the present invention includes a glow plug controller 20 for controlling a voltage applied to glow plug using pulse width modulation (PWM) method, an electronic control unit (ECU) 6, an alternator 41, a battery 4, a power-source voltage detecting apparatus 43 for detecting a voltage outputted from the power source, a glow current detecting apparatus 21 for detecting current injected to the glow plug, a starter current detecting apparatus 32 for detecting current injected to the starter, an engine water temperature detecting apparatus 5 for detecting a temperature of cooling water of the engine 1. The ECU 6 has a memory 604, and in the memory 604 a glow plug energization control program 610 is stored.

Figure 18:
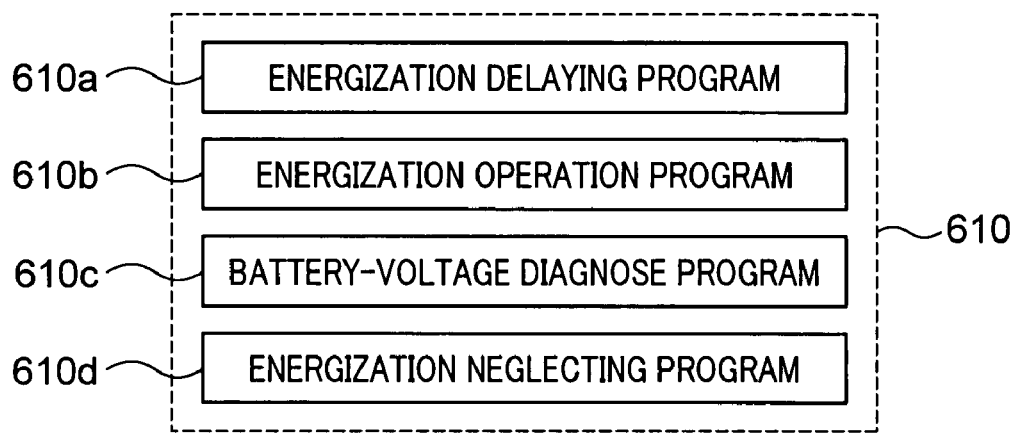
FIG. 18 is a block diagram of a glow plug energization control program according to the second embodiment of the present invention.

In the second embodiment of the present invention, the glow plug energization control program 610 has at least an energization delaying program 610*a* for stopping to supply electric power to the glow plug 2 for a calculated duration time, an energization operation program 610*b* for controlling electric power supply to the glow plug 2, battery-voltage diagnose program 610*c* for monitoring the battery voltage, the starter 3, and other electrical apparatus, and an energization neglecting program 610*d*, as shown in FIG. 18.

The energization neglecting program 610*d* controls the electric power supply processor 612 for supplying electric power from the battery 4 and/or the alternator 41 depending on the information obtained by the engine-state detecting means.

A glow plug energization neglecting means is comprised at least of the engine-state detecting processor 606, the CPU 602, the memory 604, the energization neglecting program 610*d*, and the electric power supply processor 612.

The operations and advantages of the glow plug energization control apparatus 1000 according to the present embodiment will now described below.

In the second embodiment of the present invention, it is judged whether or not there is necessity to perform the energization delay control process depending on timing when the starter 3 is actuated. If the judgment is NO, electric power supply to the glow plug 2 is immediately started. The judgment whether or not there is necessity to perform the energization delay control process is functionally carried out by the glow plug energization neglecting means which mainly includes the ECU 6 and the energization neglecting program 610*d*.

Figure 10:
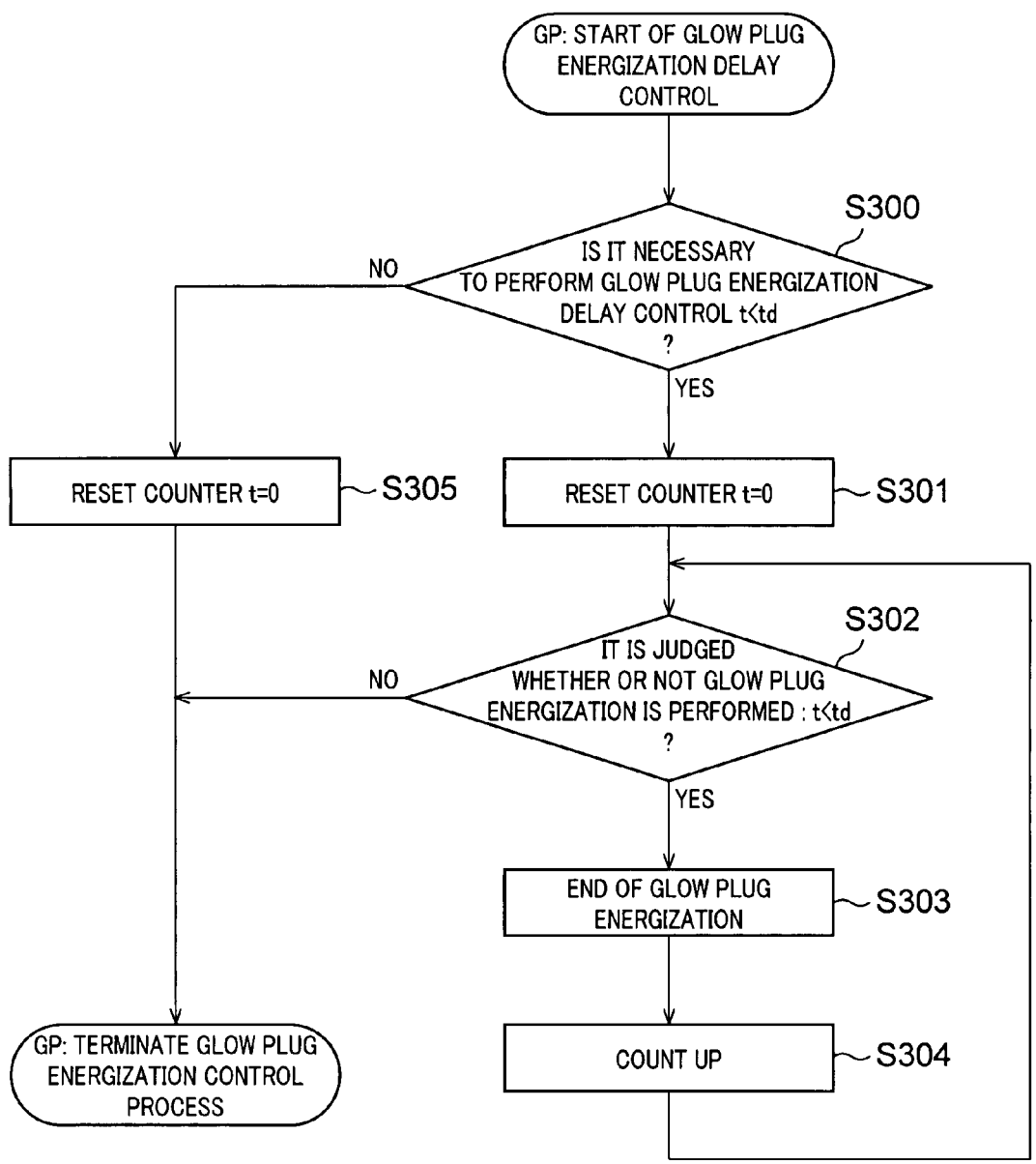
FIG. 10 shows a flowchart of a program of processing the time duration control for supplying electric power to the glow plug which includes a judging means whether or not the necessity of the time duration and a judgment based on an elapsed time, to be executed by the glow plug energization control apparatus according to the second embodiment of the present invention.

Referring FIG. 10 in which a flow chart of the energization delay control means according to the second embodiment of the present invention is illustrated, a sequence of steps will be explained.

At step 300 in the case where the starter switch 31 is not turned on when the elapsed time t since the key switch 12 is turned on is beyond the delay time td, the judgment is NO. Then the procedure proceeds to step 301.

At step 305, the elapsed time t is reset to the initial value and the energization delay control process is stopped. Thereafter, the procedure proceeds the glow plug energization control process. The glow plug energization control process is functionally carried out by mainly the ECU 6, the glow plug controller 20 and energization control program 610*b*.

At step 300, in the case where the starter switch 31 is not turned on when the elapsed time t since the key switch 12 is turned on is within the delay time td, the judgment is YES. The procedure proceeds to step 301.

At step 301, the elapsed time t is counted and the energization delay control process is started to be carried out. The energization delay control process is functionally carried out by the glow plug energization neglecting means which mainly includes the ECU 6, the glow plug controller 20 and the energization delaying program 610a.

At step 302, it is judged whether or not the elapsed time t is within the delay time td. If the judgment is YES, the procedure proceeds to step 303 where electric power supply to the glow plug 2 is stopped. After step 303 is completed, the procedure proceeds to step 304.

At step 304, the elapsed time t is counted by the time counter 614.

The procedure repeat steps 302-304 until the judgment At step 302 comes to be NO. Then the procedure proceeds the glow plug energization control process.

Figure 11:
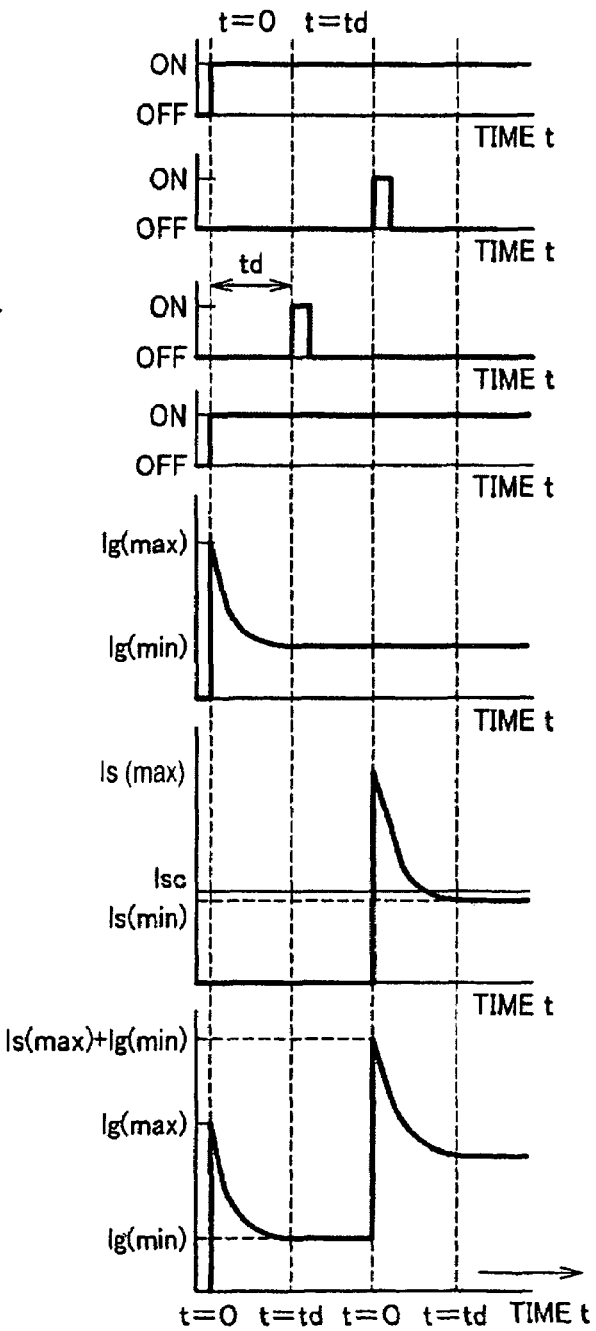

FIG. 11 shows the time chart of the energization control method according to the second embodiment of the present invention. This is the case where a timing when the starter switch 31 is turned on is later than the delay time td behind since the key switch 12 was turned on.

When the elapsed time t is larger than the delay time td, the glow plug current Ig flowing through the glow plug 2 has been decreased to the steady state value Is(min).

If electric power is supplied to the starter 3 without forbidding electric power supply to the starter 3 in this case, the sufficient starter current can be supplied to the starter 3 from the battery.

FIG. 12 shows the time chart of the energization control method according to the second embodiment of the present invention in the case where a timing when the starter switch 31 is turned on is within the delay time td after the key switch 12 was turned on.

In this case, similar to the first embodiment of the present invention, the glow plug energization delay process is executed. Since a timing when the glow plug current Ig reaches a peak value Ig(max) does not coincides with a further timing when the starter current Is reaches a peak value Is(max), it is possible to supply stably sufficient electric power to both the glow plug 2 and the starter 3 and to reliably start the engine 1.

Figure 13:
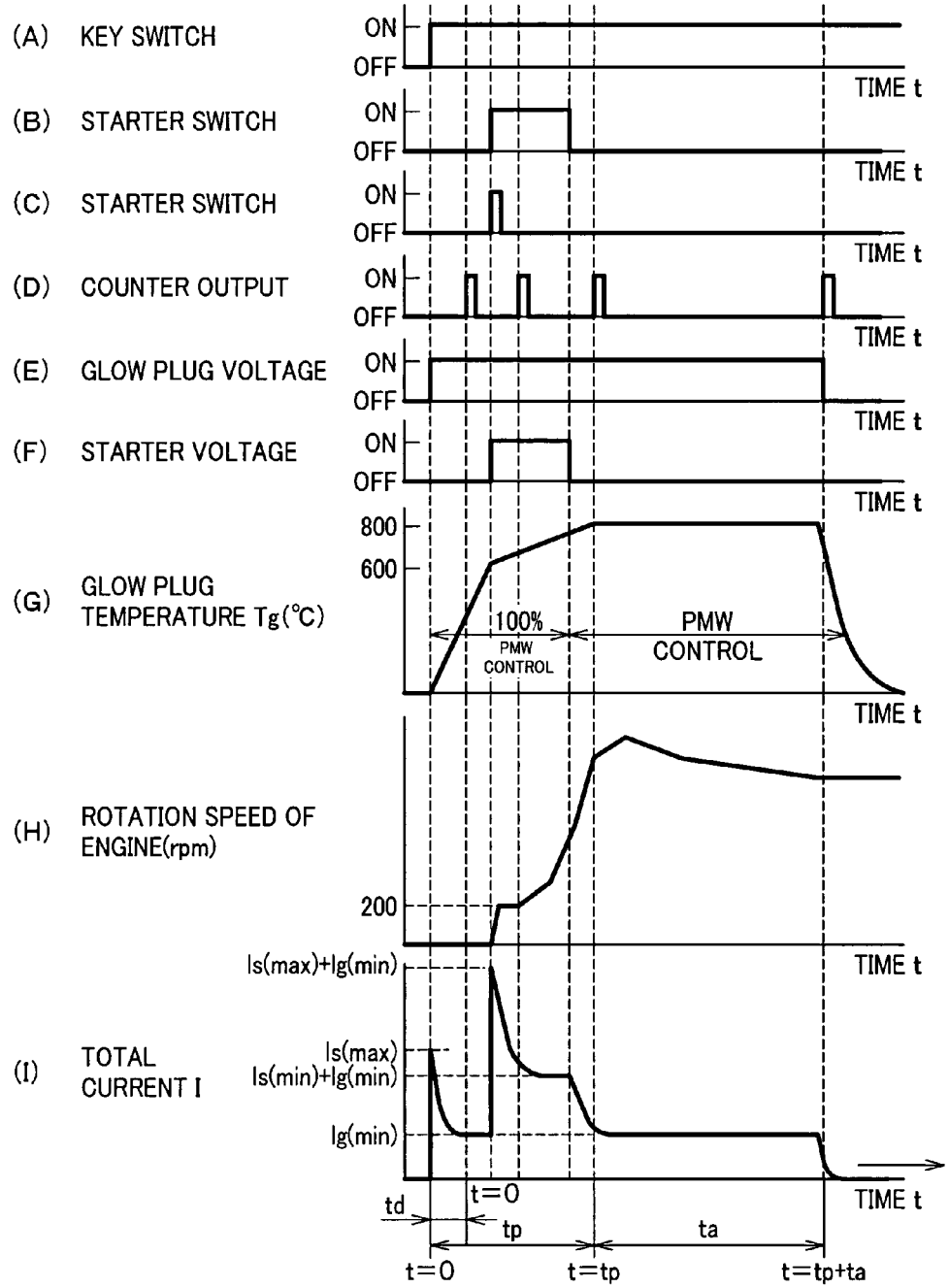

FIG. 13 shows the time chart of the energization control method according to the second embodiment of the present invention in the case where a timing when the starter switch 31 is turned on is later than the delay time td behind after the key switch 12 was turned on.

In this case, the glow plug temperature has been already raised and the glow plug current Ig flowing through the glow plug 2 has been decreased from the large inrush current Ig(max) when electric power supply to the starter 3 is started. Thus it is possible to ignite the fuel-air mixture rapidly and to actuate the engine 1 smoothly.

If supplying electric power to the starter 3 is started within the delay time td after the key switch 12 is turned on, as in the case of the first embodiment of the present invention, it is need to forbidden electric power supply to the glow plug 2 until the end of the delay time td since electric power is supplied to the starter 3 as shown in FIG. 6.

In the second embodiment, it is judged whether or not there is necessity to perform the energization delay control process depending on timing when the key switch 12 is turned on. In the modification of the glow plug energization control apparatus of this embodiment, starting electric power supply is delayed until when the glow plug current flowing through the glow plug 2 becomes to be below a predetermined value Igc.

According to the second embodiment of the present invention, it is possible to suppress the consumption of the power source, e.g., the battery 4, owing to the energization delay control method in which the timing for starting to supply electric power to the glow plug 2 does not coincide with the timing when the driver of a vehicle turns the key switch on so as to prevent coincidences of the above mentioned two timings. Hence it is possible to stably supply sufficient electric power to both the glow plug 2 and the starter 3 and to reliably start the engine 1. Therefore the vehicle driver can turn the key switch 12 on at any time.

Furthermore, some parameters on energizing the glow plug 2, such as, the pre-glow time tp, the after-glow time ta, and the delay time td, are calculated based on the states of the engine detected by the engine-state detecting means. Hence the load to the battery 4 can be suppressed because electric power supply to the glow plug 2 is controlled according to the calculated suitable condition on energizing the glow plug 2.

Moreover, the starter current through the starter 3 is rapidly decreased after the peak obtained just after the starter 3 is actuated. As a result, at the end of the delay time td the starter current comes to be the steady state one which is not so large.

Therefore after the delay time td which is optimized by the energization control apparatus according to this embodiment, electric power supply to the glow plug 2 is started so as to prevent coincidence of two peaks of the starter current and the glow plug current. Thus since overload of the battery 4 can be avoided, it is possible to stably supply sufficient electric power to the glow plug 2 and the starter 3 and to reliably start the engine 1.

Furthermore, according to the second embodiment of the present invention, the glow plug delay control is executed until when the starter current Is is decreased to a predetermined value and below. That is it is possible to optimize energizing the glow plug 2 based on the starter current Is. In this case, electric power is not supplied until when the starter current Is is decreased to a predetermined value. After the decreasing starter current Is from the inrush starter current Is(max) reaches a predetermined value, electric power supply to the glow plug 2 is started so as to minimize the time loss for heating the glow plug 2 due to the delay in supplying electric power to the glow plug 2. Therefore, it is possible to stably supply sufficient electric power to the glow plug 2 and the starter 3 and to reliably start the engine 1.

Furthermore, according to the second embodiment of the present invention, if the low-rated-voltage type glow plug is used as the glow plug 2, the temperature of the glow plug 2 can be rapidly raised and the engine 1 is rapidly actuated. Even though large inrush current is flowed through the low-rated-voltage type glow plug, the glow plug energization control apparatus controls electric power supply such that the timing for starting to supply electric power to the glow plug 2 does not coincide with the timing for starting to supply electric power to the starter 3. Therefore, since overload of the battery 4 can be avoided, it is possible to supply sufficient electric power to the low-rated-voltage type glow plug 2 and to take advantage that the glow plug 2 is of the low-rated-voltage type.

Furthermore, according to the second embodiment of the present invention, the power source for electric power supply is the battery 4 mounted on the vehicle when the engine 1 is started, and after that the power source is the alternator 41 in which electric power is generated by the generator 41a connected to the power shaft of the engine 1. During the pre-glow time tp, the glow plug energization means according to this embodiment of the present invention performs operation of the 100% PWM energization control or the first PWM energization control under which a voltage higher than the standard voltage of a power source is outputted. The pre-glow time tp is defined as a time interval between a moment when the starter switch is turned on and a further moment when electric power is set to be supplied to the glow plug 2 for heating the glow plug 2. During the after-glow time ta, the glow plug energization means performs operation of the second PWM energization control by which the effective voltage is obtained from the electric power outputted from the alternator 41. The after-glow time ta is defined as a time interval between a moment when the engine 1 is started and a further moment when electric power supply to the glow plug 2 is ended.

In actuating the engine when generators can not output any electric power, the power source is only the battery 4 which does not generally have redundant capacity. The glow plug energization control method controls electric power supply to the glow plug 2 so as to prevent coincidences of two peaks of the starter current and the glow plug current. Thus, overload of the battery 4 can be avoided.

Therefore, since during the pre-glow time tp, the glow plug energization control method performs operation of the 100% PWM energization control or the first PWM energization control under which a higher voltage than the standard voltage of a power source is outputted, it is possible to heat up the glow plug 2 rapidly and to actuate the engine 1 smoothly.

Moreover, after the engine 1 is started, electric power generated by the alternator 41 can be used not only for supplying power to the glow plug 2, the other actuator such as injectors for fuel injection, but also for charging the battery 4. In particular, during the after-glow time ta, the glow plug energization means performs operation of the second PWM energization control by which the effective voltage is obtained from the electric power outputted from the alternator 41.

Therefore, since the glow plug temperature can be kept at level being prevented from dropping, it is possible to stabilize the engine speed.

Furthermore, according to the second embodiment of the present invention, the glow plug energization control apparatus has the engine-state detecting means. When the ECU 6 detects an abnormal electric signal from the engine-state detecting means, it is possible to stop to supply electric power to the glow plug 2.

For example, the ECU 6 monitors alternator voltage. When the ECU 6 detects an abnormal value of alternator voltage, the ECU 6 stops to supply electric power to the glow plug 2. Thus it is possible to protect the glow plug 2.

According to the second embodiment of the present invention, when the driver of the vehicle turns the key switch 12 on without considering pre-heating the engine by the glow plug 2, the energization delay control method shifts the timing for starting to supply electric power to the glow plug 2 from the timing so as to prevent coincidence of the above mentioned two timings. Therefore electric power supplied to the glow plug 2 is not affected by the existence of the starter which has a large inrush current. Furthermore, the diesel engine can be actuated rapidly. Even in a very cold weather, electric power supply to the glow plug 2 is optimized based on the states of the engine 1. Therefore, it is possible to suppress the load of the battery 4 and to improve the life of the glow plug 2.

Therefore, even when the vehicle driver turns the starter switch 31 on without considering the electric power supplying to the glow plug 2, it is possible to actuate the engine 1 since sufficient electric power is supplied to the glow plug 2.

Furthermore, according to the second embodiment of the present invention, in the case where electric power is supplied to the glow plug 2 before electric power is supplied to the starter 3, or in the case where the starter switch is turned on shortly after electric power supply to the glow plug 2 is started, or in the case where the glow plug current Ig is not sufficiently decreased, the glow plug energization apparatus controls such that electric power supply to the glow plug 2 is stopped.

In this case, the glow plug energization delay process is executed instead of performing electric power supply. Since a timing when the glow plug current Ig reach a peak value Ig(max) is shifted in time from a further timing when the starter current Is reach a peak value Is(max), it is possible to stably supply sufficient electric power to the glow plug 2 and the starter 3 and to reliably start the engine 1.

In a case where the glow plug temperature has been already raised and the glow plug current Ig flowing through the glow plug 2 has been decreased, the glow plug energization delay process is executed after electric power supply to the starter is started and electric power supply to the glow plug 2 is restarted after the glow plug energization process is completed. Therefore, the load of the battery 4 is enhanced.

Hence when electric power supply to the starter 3 is started, the glow plug energization neglecting process is executed to judge whether or not there is necessity to execute the glow plug energization delay process. If the judgment is YES, the procedure proceed the glow plug energization delay process.

Therefore, since electric power loss in supplying electric power to the glow plug 2 is minimized and it is possible to prevent coincidence of two peaks of the starter current and the glow plug current, it is possible to supply sufficient electric power to the glow plug 2 and the starter 3 with stability and to start the engine 1 with reliability.

Moreover according to the second embodiment of the present invention, the glow plug energization neglecting process controls electric supply to the glow plug 2 such that if the elapsed time t from a moment when the key switch 12 is turned on is shorter than a predetermined time, the glow plug energization delay process will be executed.

After the key switch 12 is turned on, if a moment when it starts to supply electric power to the starter 3 is later than a further moment when electric power supply to the glow plug 2 is started, the glow plug energization delay process for stopping electric power supply to the glow plug 2 is executed in order to make the peak of the starter current go past. After the glow plug energization delay process is completed, it is restarted to supply electric power to the glow plug 2.

On the other hand, after the key switch 12 is turned on, if the elapsed time during which electric power is supplied to the glow plug 2 comes to be larger than a predetermined time without activation of the starter 3, the glow plug current flowing through the glow plug 2 has become to be the steady state value. Therefore it is not necessary to stop supplying electric power to the glow plug 2.

Therefore, it is possible to control efficiently electric power supply to the glow plug 2 in a manner where only if a moment when it is started to supply electric power to the starter 3 is later than a further moment when it is started to supply electric power to the glow plug 2, the glow plug energization delay process for stopping electric power supply to the glow plug 2 is executed.

Furthermore according to the second embodiment of the present invention, the glow plug energization neglecting means controls to execute the glow plug energization delay process only if the glow plug current flowing through the glow plug 2 is equal to or greater than a predetermined value.

While the glow plug current flowing through the glow plug 2 is equal to or greater than a predetermined value, if electric power supply is started, the glow plug energization delay process is executed and electric power is supplied to the glow plug 2.

On the other hand, while the glow plug current flowing through the glow plug 2 is smaller than a predetermined value, electric power supply can be started without executing the glow plug energization delay process.

Therefore it is possible to control efficiently electric power supply to the glow plug 2 in a manner where only if the glow plug current flowing through the glow plug 2 is equal to or greater than a predetermined value, the glow plug energization delay process is executed and electric power is supplied to the glow plug 2.

Although the ECU 6 monitors the starter current Is in the above statement, it is possible the ECU 6 judges whether or not there is a necessity to supply electric power to the glow plug 2 based on information other than the starter current Is, for example, the engine water temperature.

Moreover, it is possible to construct the ECU 6 such that the information stored in the memory 604 may be updated constantly and the updated information is used to judge whether or not there is a necessity to supply electric power to the glow plug 2.

According to the second embodiment of the present invention, when the vehicle driver turns the key switch 12 on without considering the pre-heating the engine by the glow plug 2, the energization delay control method shifts the timing for starting to supply electric power to the glow plug 2 from the timing for starting to supply electric power to the starter 3 so as to prevent coincidence of the above mentioned two timings. Therefore electric power supplied to the glow plug 2 is not affected by the existence of the starter which has large inrush current. Furthermore the diesel engine can be actuated rapidly. Even in very cold climate, electric power supply to the glow plug 2 is optimized based on the states of the engine 1. Therefore it is possible to suppress the load of the battery 4 and to improve the life of the glow plug 2.

Furthermore, according to the second embodiment of the present invention, if the low-rated-voltage type glow plug is used as the glow plug 2, the temperature of the glow plug 2 can be rapidly raised and the engine 1 is rapidly actuated. Even though large inrush current is flowed through the low-rated-voltage type glow plug, the glow plug energization control apparatus controls electric power supply such that the timing for starting to supply electric power to the glow plug 2 is shifted in time from the timing for starting to supply electric power to the starter 3. Therefore since overload of the battery 4 can be avoided, it is possible to supply sufficient electric power to the low-rated-voltage type glow plug 2 and to take advantage that the glow plug 2 is of the low-rated-voltage type.

While the present invention has been disclosed in terms of the preferred embodiments in order to facilitate better understanding thereof, is should be appreciated that the invention can be embodied in various way without departing the principle of the invention. Therefore the variations should be understand to include all possible embodiments and modifications to the shown embodiments which can be embodied without departing the principle of the invention as set forth in the appended claims.

For example, even though the pre-glow time tp, the afterglow time ta, and the delay time td are calculated based on the engine water temperature Tw and the power source voltage +B in the second embodiment, it may be possible to judged whether or not there is necessity to supply electric power to the glow plug 2 before the starter switch 31 is turned on based on the engine speed Ne.

For further example, the starter switch may be operated under programmable control which is determined by the driver of the vehicle. That is, the starter switch 31 may be turned on by any way which is reflected by the driver's intention. Hence the starter switch 31 may be turned to a power-off position under automatic operation based on the engine speed Ne. For example, the starter switch 31 is turned to a power-off position if the engine speed Ne exceeds a predetermined value.

What is claimed is:

1. A control apparatus for controlling supply of electric power to a glow plug and a starter to start a diesel engine, comprising:

an engine state detector that detects an operating condition of the diesel engine when the diesel engine is started;

a delay time calculator that calculates a delay time as a function of the detected operating condition of the diesel engine, the delay time being an interval by which start of the supply of the electric power to the glow plug is to be delayed after start of the supply of the electric power to the starter to form a time difference between a first moment when a first instantaneous amount of the electric power consumed by the starter reaches maximum and a second moment when a second instantaneous amount of the electric power consumed by the glow plug reaches maximum; and a controller that controls the start of the supply of the electric power to the glow plug after the delay time has elapsed since the electric power has been started to supply to the starter such that the electric power is distributed to the starter and the glow plug to ensure working of the starter and the glow plug against being malfunction due to short of the electric power.

2. The control apparatus according to claim 1, wherein the controller controls the start of the supply of the electric power to the glow plug such that the electric power is started to be supplied to the glow plug when a starter current flowing through the starter is decreased down to a predetermined current value.

3. The control apparatus according to claim 2, wherein the controller judges whether or not there is a necessity to delay the start of the supply of the electric power to the glow plug by the delay time.

4. The control apparatus according to claim 3, wherein the controller delays the start of the supply of the electric power to the glow plug by the delay time when it is determined that there is the necessity of the delay.

5. The control apparatus according to claim 3, further comprising a key switch used for activating the control apparatus itself, wherein the controller judges whether or not an elapsed time passing from a time moment when the key switch is turned on thereof to a time moment when the electric power is started to be supplied to the starter is shorter than a predetermined interval of time.

6. The control apparatus according to claim 5, wherein the controller controls the start of the supply of the electric power supply such that, when it is determined that the elapsed time is shorter than the predetermined period of time, the start of the supply of the electric power is delayed by the delay time.

7. The control apparatus according to claim 3, wherein the controller further judges whether a glow plug current flowing through the glow plug is larger than a predetermined current value.

8. The control apparatus according to claim 7, wherein the controller controls the supply of the electric power such that, when it is judged that the glow plug current is larger than the predetermined current value, the start of the supply of the electric power is delayed by the delay time.

9. The control apparatus according to claim 1, wherein the glow plug is of low rated-voltage type.

10. The control apparatus according to claim 1, wherein the glow plug is of low rated-voltage type.

11. The control apparatus according to claim 1, wherein before the engine is started, the power source is served by a battery, and after the engine is started, the power source is served by an alternator which converts a rotary torque produced by the engine to the electric power.

12. The control apparatus according to claim 11, wherein the controller controls the supply of the electric power from the battery under a pulse width modulation (PWM) control during an interval of time from a time moment when the engine is ignited and a further time moment when the engine is started to run.

13. The control apparatus according to claim 11, wherein the controller controls the supply of the electric power from the alternator under a pulse width modulation (PWM) control, after the engine is started to run.

14. The control apparatus according to claim 1, wherein the controller judges whether or not an output voltage of the power source is within a predetermined abnormal range previously assigned to the output voltage, and stops the electric power from being supplied to the glow plug when it is determined that the output voltage of the power source falls within the predetermined abnormal range.

15. A method for controlling supply of electric power to a starter and a glow plug to start a diesel engine, comprising steps of:

detecting an operating condition of the diesel engine when the diesel engine is started;

calculating a delay time as a function of the detected operating condition of the diesel engine, the delay time being an interval by which start of the supply of the electric power to the glow plug is to be delayed after start of the supply of the electric power to the starter to form a time difference between a first moment when a first instantaneous amount of the electric power consumed by the starter reaches maximum and a second moment when a second instantaneous amount of the electric power consumed by the glow plug reaches maximum; and controlling the start of the supply of the electric power to the glow plug after the delay time has elapsed since the electric power has been started to supply to the starter such that the electric power is distributed to the starter and the glow plug to ensure working of the starter and the glow plug against being malfunction due to short of the electric power.

* * * * *